US009291081B2

(12) United States Patent
Stanavich et al.

(10) Patent No.: US 9,291,081 B2
(45) Date of Patent: Mar. 22, 2016

(54) AXIAL FLOW ATOMIZATION MODULE

(71) Applicant: Tenneco Automotive Operating Company Inc., Lake Forest, IL (US)

(72) Inventors: John Stanavich, Chelsea, MI (US); William Adams, Parma, MI (US); Figen Lacin, Dexter, MI (US); Manoj K. Sampath, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 115 days.

(21) Appl. No.: 14/165,923

(22) Filed: Jan. 28, 2014

(65) Prior Publication Data

US 2014/0334987 A1 Nov. 13, 2014

Related U.S. Application Data

(63) Continuation-in-part of application No. 13/958,955, filed on Aug. 5, 2013, which is a continuation-in-part of application No. 13/888,861, filed on May 7, 2013.

(51) Int. Cl.
*B01D 50/00* (2006.01)
*F01N 3/20* (2006.01)
(Continued)

(52) U.S. Cl.
CPC .......... *F01N 3/2093* (2013.01); *B01F 3/04049* (2013.01); *B01F 5/0451* (2013.01); *B01F 5/0606* (2013.01); *B01F 5/0616* (2013.01); *B01F 5/0688* (2013.01); *F01N 3/021* (2013.01); *F01N 3/106* (2013.01); *F01N 3/2066* (2013.01); *F01N 3/2892* (2013.01); *F01N 13/009* (2014.06); *F01N 13/0097* (2014.06); *F01N 2470/02* (2013.01); *F01N 2470/18* (2013.01);
(Continued)

(58) Field of Classification Search
CPC . F01N 2470/18; F01N 2610/02; F01N 3/106; F01N 13/0097; B01F 5/0688; B01F 5/0451
USPC .......................................... 422/168, 176, 177
See application file for complete search history.

(56) References Cited

U.S. PATENT DOCUMENTS 3,544,290 A 12/1970 Larson et al.
3,549,333 A 12/1970 Tabak
(Continued)

FOREIGN PATENT DOCUMENTS

DE 4025017 A1 2/1992
DE 4307525 A1 9/1994
(Continued)

*Primary Examiner* — Tom P Duong
(74) *Attorney, Agent, or Firm* — Harness, Dickey & Pierce, P.L.C.

(57) ABSTRACT

An exhaust treatment component for treating an engine exhaust. The component includes a housing including an inlet and an outlet, and a mixing assembly located within the housing between the inlet and the outlet. The mixing assembly includes a decomposition tube having a first end and a second end. The first end is configured to receive the exhaust from the inlet and is configured to receive a reagent exhaust treatment fluid. A flow reversing device is disposed proximate the second end, and the flow reversing device is configured to direct a mixture of the exhaust and reagent exhaust treatment fluid as the mixture exits the second end of the decomposition tube in a direction back toward the first end, wherein the flow reversing device includes a plurality of deflecting members for intermixing the exhaust and reagent exhaust treatment fluid.

19 Claims, 35 Drawing Sheets

(51) Int. Cl.
*B01F 5/04* (2006.01)
*B01F 5/06* (2006.01)
*B01F 3/04* (2006.01)
*F01N 3/10* (2006.01)
*F01N 3/28* (2006.01)
*F01N 3/021* (2006.01)
*F01N 13/00* (2010.01)

(52) U.S. Cl.
CPC ....... *F01N 2560/026* (2013.01); *F01N 2610/02* (2013.01); *F01N 2610/1453* (2013.01); *Y02T 10/24* (2013.01)

(56) References Cited

U.S. PATENT DOCUMENTS

| | | | |
|---|---|---|---|
| 3,643,623 A | 2/1972 | Eng et al. |
| 3,756,575 A | 9/1973 | Cottell |
| 4,011,922 A | 3/1977 | Goplen |
| 4,209,493 A | 6/1980 | Olson |
| 4,300,924 A | 11/1981 | Coyle |
| 4,538,413 A | 9/1985 | Shinzawa et al. |
| 4,541,239 A | 9/1985 | Tokura et al. |
| 4,571,938 A | 2/1986 | Sakurai |
| 4,576,617 A | 3/1986 | Renevot |
| 4,604,868 A | 8/1986 | Nomoto et al. |
| 4,725,223 A | 2/1988 | Coppin et al. |
| 4,840,028 A | 6/1989 | Kusuda et al. |
| 4,912,920 A | 4/1990 | Hirabayashi |
| 4,951,464 A | 8/1990 | Eickhoff et al. |
| 4,987,738 A | 1/1991 | Lopez-Crevillen et al. |
| 4,989,408 A | 2/1991 | Leonhard et al. |
| 5,094,075 A | 3/1992 | Berendes |
| 5,105,621 A | 4/1992 | Simmons et al. |
| 5,140,814 A | 8/1992 | Kreutmair et al. |
| 5,272,871 A | 12/1993 | Oshima et al. |
| 5,320,523 A | 6/1994 | Stark |
| 5,339,630 A | 8/1994 | Pettit |
| 5,426,269 A | 6/1995 | Wagner et al. |
| 5,826,428 A | 10/1998 | Blaschke |
| 5,829,248 A | 11/1998 | Clifton |
| 5,832,720 A | 11/1998 | Svahn |
| 6,158,214 A | 12/2000 | Kempka et al. |
| 6,312,650 B1 | 11/2001 | Frederiksen et al. |
| 6,314,722 B1 | 11/2001 | Matros et al. |
| 6,449,947 B1 | 9/2002 | Liu et al. |
| 6,712,869 B2 | 3/2004 | Cheng et al. |
| 6,722,123 B2 | 4/2004 | Liu et al. |
| 6,722,124 B2 | 4/2004 | Pawson et al. |
| 7,712,305 B2 | 5/2010 | Kapsos et al. |
| 7,748,212 B2 | 7/2010 | Sedlacek et al. |
| 7,849,676 B2 | 12/2010 | Witte-Merl |
| 7,856,807 B2 | 12/2010 | Gibson |
| 7,896,645 B2 | 3/2011 | Loving |
| 7,908,847 B2 | 3/2011 | Crawley et al. |
| 7,980,069 B2 | 7/2011 | Arellano et al. |
| 8,033,104 B2 | 10/2011 | Zhang |
| 8,141,353 B2 | 3/2012 | Zheng et al. |
| 8,146,343 B2 | 4/2012 | Patterson et al. |
| 8,173,088 B2 | 5/2012 | Makartchouk et al. |
| 8,240,137 B2 | 8/2012 | Liu et al. |
| 8,695,330 B2 | 4/2014 | Davidson et al. |
| 8,745,979 B2 | 6/2014 | Sedlacek et al. |
| 8,938,954 B2 * | 1/2015 | De Rudder et al. ............. 60/317 |
| 2003/0079467 A1 | 5/2003 | Liu et al. |
| 2006/0115402 A1 | 6/2006 | Sun et al. |
| 2009/0019843 A1 | 1/2009 | Levin et al. |
| 2009/0255242 A1 | 10/2009 | Paterson et al. |
| 2009/0313979 A1 | 12/2009 | Kowada |
| 2010/0139258 A1 | 6/2010 | Hackett et al. |
| 2010/0223916 A1 * | 9/2010 | Hayashi et al. ................ 60/295 |
| 2011/0041478 A1 | 2/2011 | Lee et al. |
| 2011/0083428 A1 | 4/2011 | Makartchouk |
| 2011/0099978 A1 | 5/2011 | Davidson et al. |
| 2011/0308234 A1 | 12/2011 | De Rudder et al. |
| 2012/0227390 A1 | 9/2012 | Wikaryasz et al. |
| 2012/0260635 A1 | 10/2012 | Aneja et al. |
| 2013/0170973 A1 | 7/2013 | Staskowiak et al. |
| 2013/0333363 A1 | 12/2013 | Joshi et al. |

FOREIGN PATENT DOCUMENTS

| | | |
|---|---|---|
| DE | 4417238 A1 | 9/1994 |
| DE | 4440716 A1 | 7/1996 |
| DE | 102004000066 A1 | 6/2006 |
| DE | 102009036511 | 2/2011 |
| EP | 0470361 A1 | 2/1992 |
| EP | 0555746 A1 | 8/1993 |
| GB | 2381218 A | 4/2003 |
| JP | S59-174310 U | 11/1984 |
| JP | H01-130009 A | 5/1989 |
| JP | H05-332130 A | 12/1993 |
| JP | H10-259712 A | 9/1998 |
| JP | H11-117729 A | 4/1999 |
| JP | 2000145434 A | 5/2000 |
| JP | 2003074335 A | 3/2003 |
| JP | 2009103019 A | 5/2009 |
| JP | 2011064069 A | 3/2011 |
| JP | 2011519400 A | 7/2011 |
| JP | H05288047 A | 2/2013 |
| WO | WO-9612877 A1 | 5/1996 |
| WO | WO-2008030259 A1 | 3/2008 |
| WO | WO-2008112343 A2 | 9/2008 |
| WO | WO-2012044233 | 4/2012 |
| WO | WO2013/048309 | 4/2013 |

* cited by examiner

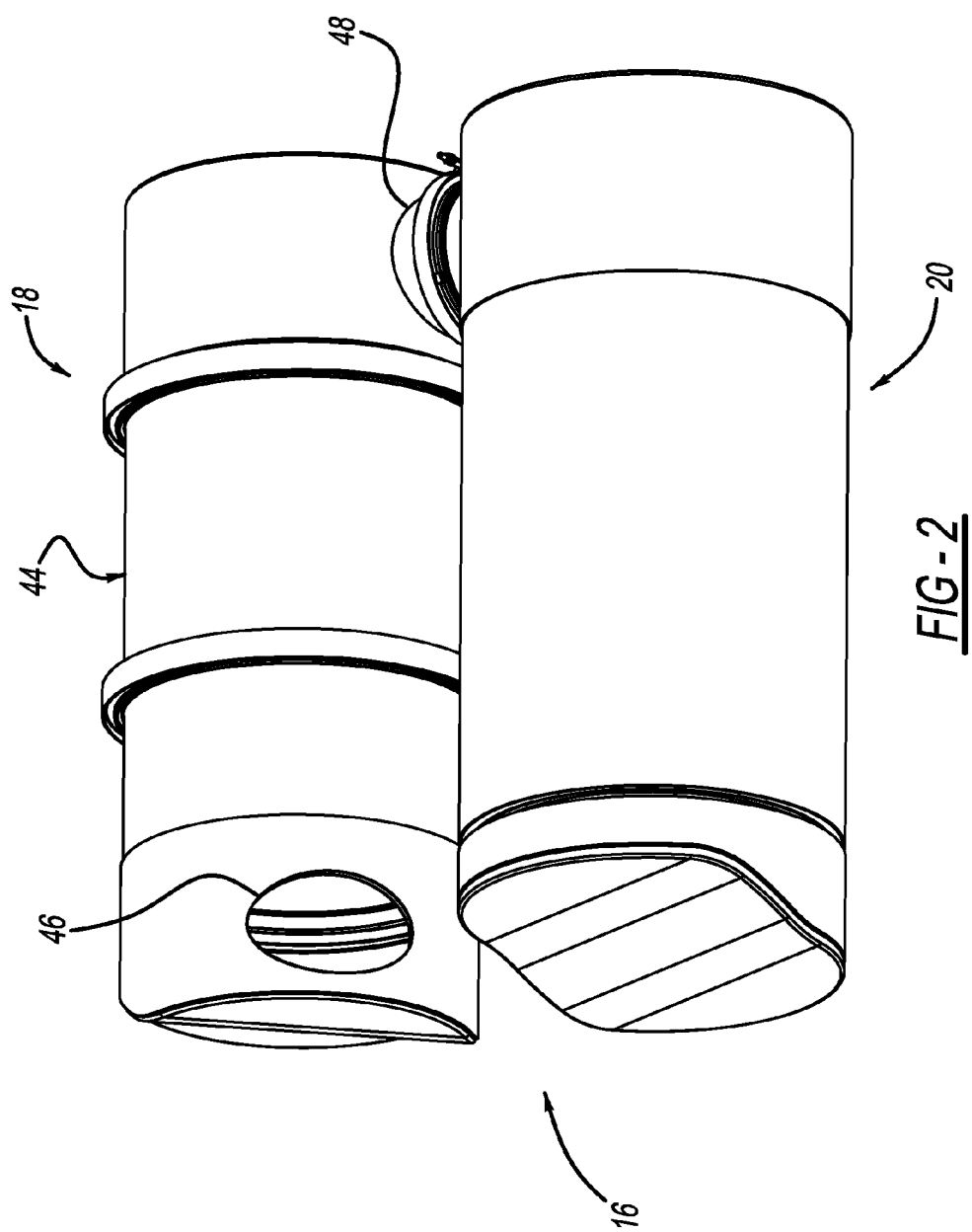

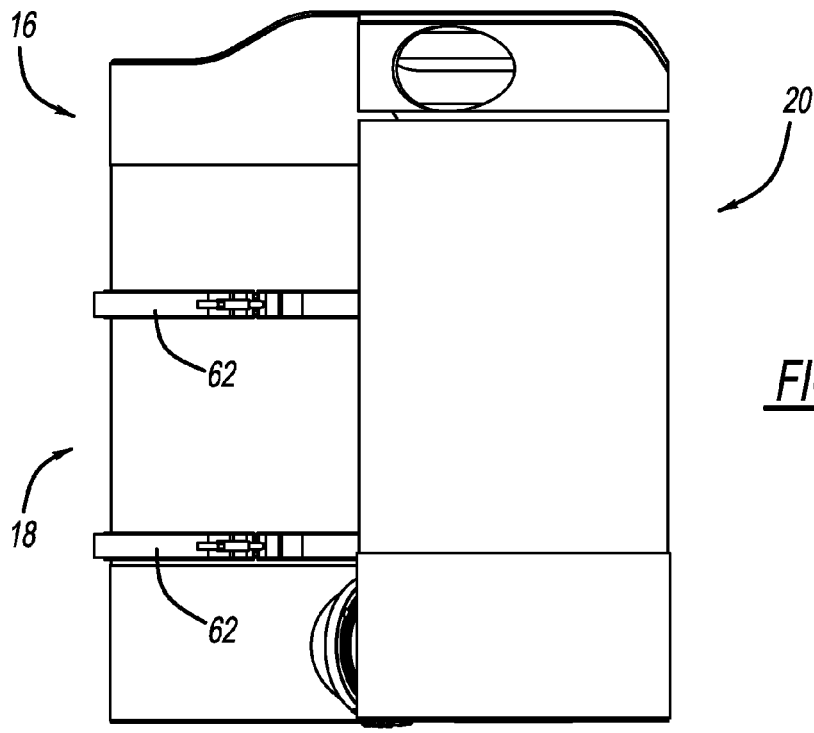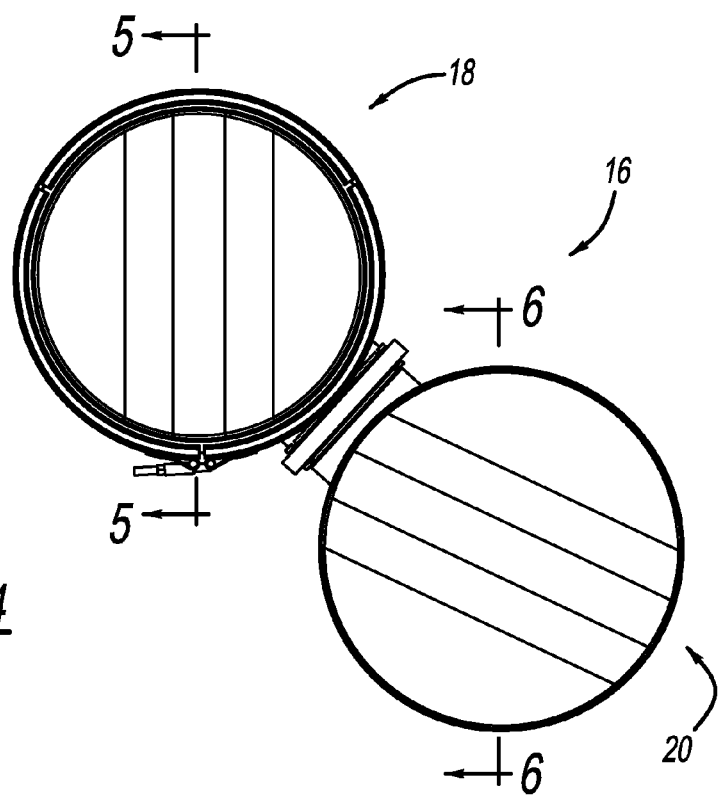

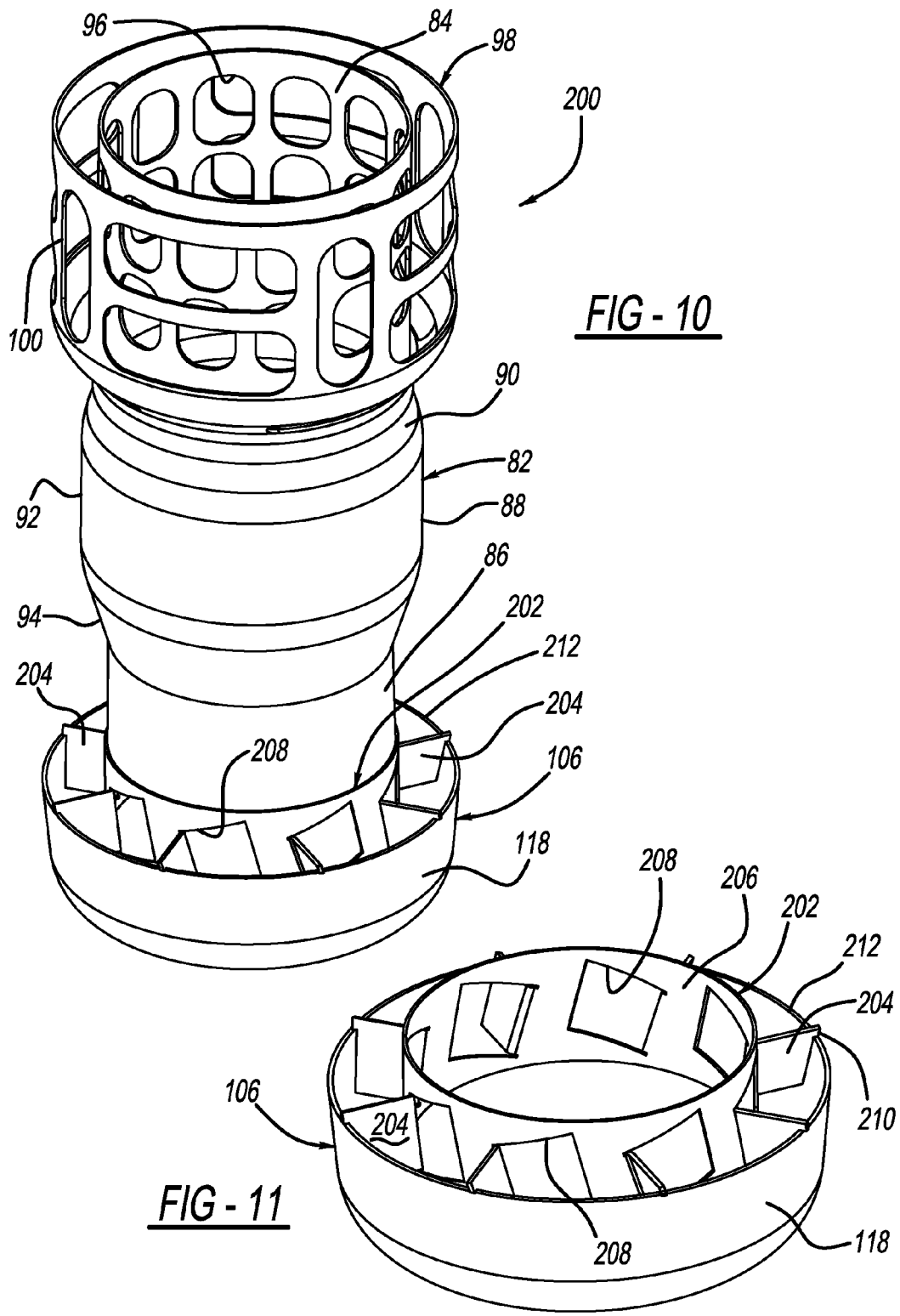

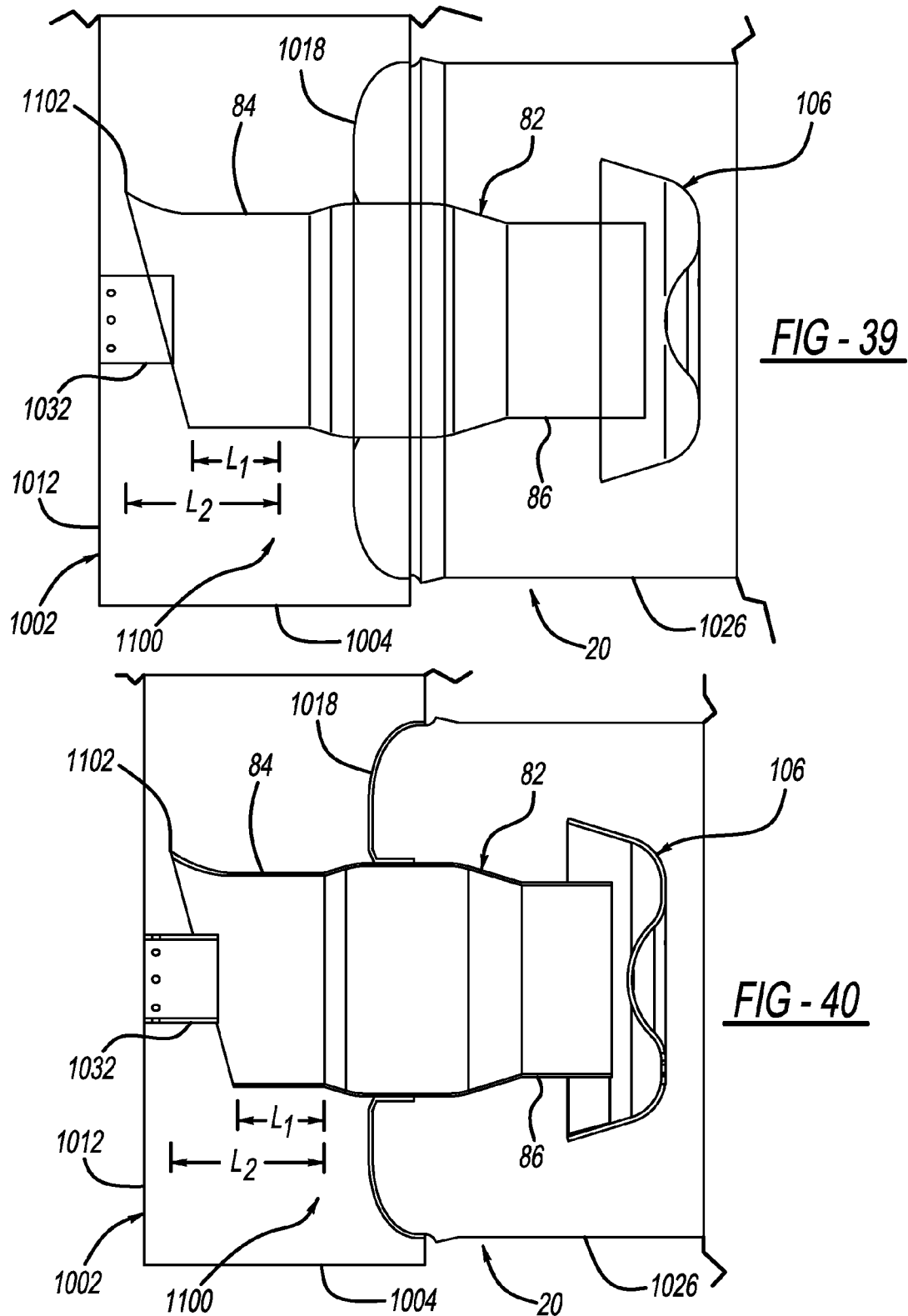

US 9,291,081 B2

AXIAL FLOW ATOMIZATION MODULE

CROSS-REFERENCE TO RELATED APPLICATIONS

This application is a continuation-in-part of U.S. patent application Ser. No. 13/958,955 filed Aug. 5, 2013, which is a continuation-in-part of U.S. patent application Ser. No. 13/888,861 filed May 7, 2013. The entire disclosure of each of the above applications is incorporated herein by reference.

FIELD

The present disclosure relates to an exhaust after-treatment system including an exhaust gas mixing device.

BACKGROUND

This section provides background information related to the present disclosure which is not necessarily prior art.

Exhaust after-treatment systems may dose a reagent exhaust treatment fluid into the exhaust stream before the exhaust stream passes through various exhaust after-treatment components. A urea exhaust treatment fluid, for example, may be dosed into the exhaust stream before the exhaust passes through a selective catalytic reduction (SCR) catalyst. The SCR catalyst is most effective, however, when the exhaust has sufficiently mixed with the urea exhaust treatment fluid.

SUMMARY

This section provides a general summary of the disclosure, and is not a comprehensive disclosure of its full scope or all of its features.

The present disclosure provides an exhaust treatment component for treating an engine exhaust. The component includes a housing including an inlet and an outlet, and a mixing assembly located within the housing between the inlet and the outlet. The mixing assembly includes a decomposition tube having a first end and a second end. The first end is configured to receive the exhaust from the inlet and is configured to receive a reagent exhaust treatment fluid. A flow reversing device is disposed proximate the second end, and the flow reversing device is configured to direct a mixture of the exhaust and reagent exhaust treatment fluid as the mixture exits the second end of the decomposition tube in a direction back toward the first end, wherein the flow reversing device includes a plurality of deflecting members for intermixing the exhaust and reagent exhaust treatment fluid.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a perspective view of an exhaust treatment component according to a principle of the present disclosure;

FIG. 3 is a side-perspective view of the exhaust treatment component illustrated in FIG. 2;

FIG. 4 is a front-perspective view of the exhaust treatment component illustrated in FIG. 2;

FIG. 10 is a perspective view of a mixing assembly according to a second exemplary embodiment of the present disclosure;

FIG. 11 is a perspective view of a flow-reversing device and dispersion device of the mixing assembly illustrated in FIG. 10;

FIG. 39 is a side-perspective view of a mixing assembly according to a principle of the present disclosure;

FIG. 40 is a cross-sectional view of the mixing assembly illustrated in FIG. 39;

Corresponding reference numerals indicate corresponding parts throughout the several views of the drawings.

DETAILED DESCRIPTION

Example embodiments will now be described more fully with reference to the accompanying drawings.

Figure 1:
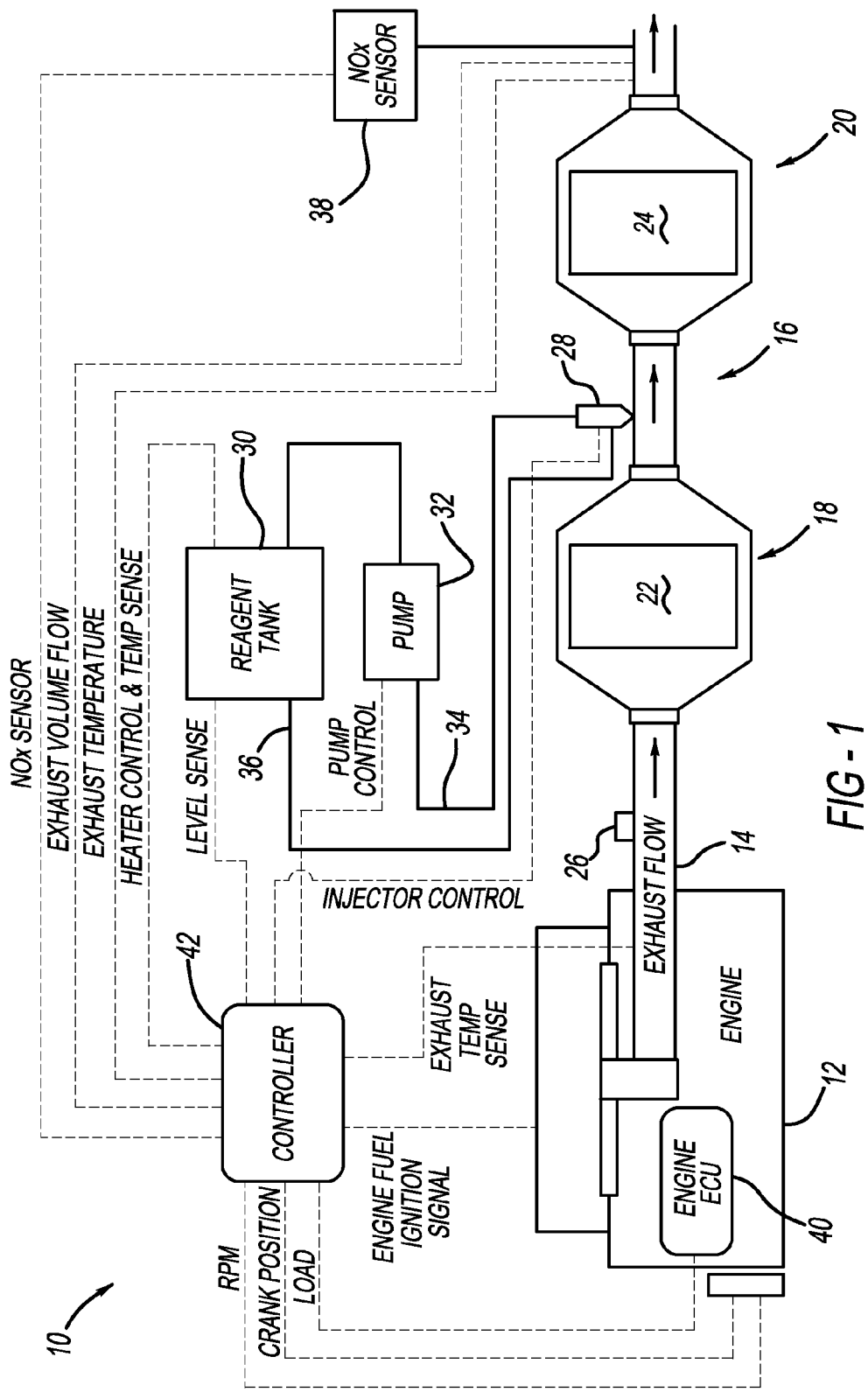
FIG. 1 is a schematic representation of an exhaust system according to a principle of the present disclosure.
Figure 5:
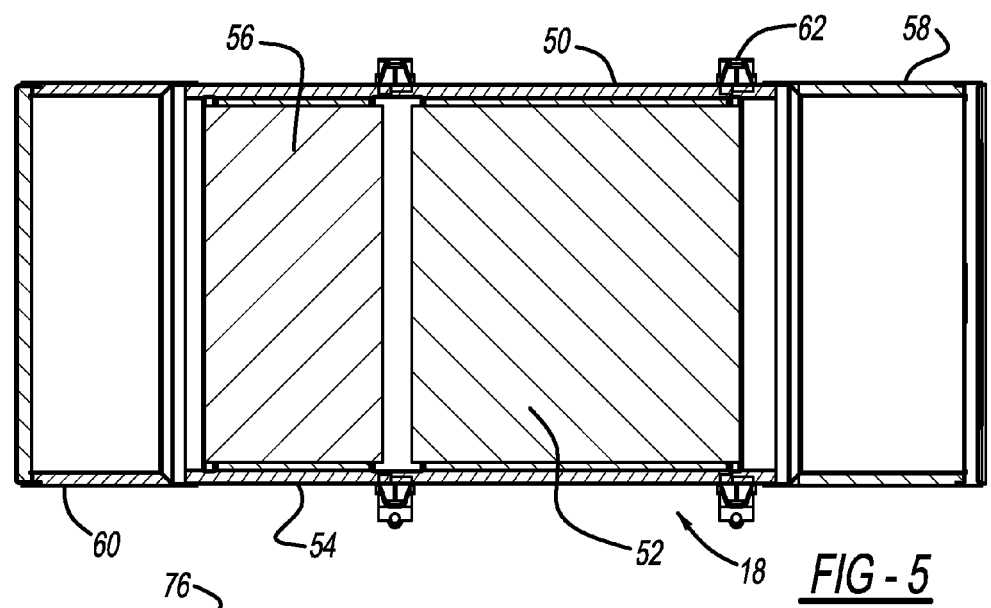
FIG. 5 is a cross-sectional view along line 5-5 in FIG. 4.

FIG. 1 schematically illustrates an exhaust system 10 according to the present disclosure. Exhaust system 10 can include at least an engine 12 in communication with a fuel source (not shown) that, once consumed, will produce exhaust gases that are discharged into an exhaust passage 14 having an exhaust after-treatment system 16. Downstream from engine 12 can be disposed a pair of exhaust treatment components 18 and 20, which can include catalyst-coated substrates or filters 22 and 24. Catalyst-coated substrates or filters 22 and 24 can be any combination of a diesel particulate filter (DPF), a diesel oxidation catalyst (DOC), a selective catalytic reduction (SCR) component, a lean $NO_x$ catalyst, an ammonia slip catalyst, or any other type of exhaust treatment device known to one skilled in the art. If a DPF is used, it may be catalyst-coated.

Although not required by the present disclosure, exhaust after-treatment system 16 can further include components such as a thermal enhancement device or burner 26 to increase a temperature of the exhaust gases passing through exhaust passage 14. Increasing the temperature of the exhaust gas is favorable to achieve light-off of the catalyst in the exhaust treatment component 18 in cold-weather conditions and upon start-up of engine 12, as well as initiate regeneration of the exhaust treatment component 18 when the exhaust treatment substrate 22 or 24 is a DPF.

To assist in reduction of the emissions produced by engine 12, exhaust after-treatment system 16 can include a dosing module 28 for periodically dosing an exhaust treatment fluid into the exhaust stream. As illustrated in FIG. 1, dosing module 28 can be located upstream of exhaust treatment component 18, and is operable to inject an exhaust treatment fluid into the exhaust stream. In this regard, dosing module 28 is in fluid communication with a reagent tank 30 and a pump 32 by way of inlet line 34 to dose an exhaust treatment fluid such as diesel fuel or urea into the exhaust passage 14 upstream of exhaust treatment components 18 and 20. Dosing module 28 can also be in communication with reagent tank 30 via return line 36. Return line 36 allows for any exhaust treatment fluid not dosed into the exhaust stream to be returned to reagent tank 30. Flow of the exhaust treatment fluid through inlet line 34, dosing module 28, and return line 36 also assists in cooling dosing module 28 so that dosing module 28 does not overheat. Although not illustrated in the drawings, dosing module 28 can be configured to include a cooling jacket that passes a coolant around dosing module 28 to cool it.

The amount of exhaust treatment fluid required to effectively treat the exhaust stream may vary with load, engine speed, exhaust gas temperature, exhaust gas flow, engine fuel injection timing, desired $NO_x$ reduction, barometric pressure, relative humidity, EGR rate and engine coolant temperature. A $NO_x$ sensor or meter 38 may be positioned downstream from exhaust treatment component 18. $NO_x$ sensor 38 is operable to output a signal indicative of the exhaust $NO_x$ content to an engine control unit 40. All or some of the engine operating parameters may be supplied from engine control unit 40 via the engine/vehicle databus to a reagent electronic dosing controller 42. The reagent electronic dosing controller 42 could also be included as part of the engine control unit 40. Exhaust gas temperature, exhaust gas flow and exhaust back pressure and other vehicle operating parameters may be measured by respective sensors, as indicated in FIG. 1.

The amount of exhaust treatment fluid required to effectively treat the exhaust stream can also be dependent on the size of the engine 12. In this regard, large-scale diesel engines used in locomotives, marine applications, and stationary applications can have exhaust flow rates that exceed the capacity of a single dosing module 28. Accordingly, although only a single dosing module 28 is illustrated for dosing exhaust treatment fluid, it should be understood that multiple dosing modules 28 for reagent injection are contemplated by the present disclosure.

Referring to FIGS. 2-6, an exemplary configuration of exhaust treatment components 18 and 20 is illustrated. As best shown in FIG. 2, exhaust treatment components 18 and 20 are arranged parallel to one another. It should be understood, however, that exhaust treatment components 18 and 20 can be arranged substantially co-axially, without departing from the scope of the present disclosure.

Exhaust treatment component 18 may include a housing 44, an inlet 46, and an outlet 48. Inlet 46 may be in communication with exhaust passage 14, and outlet 48 may be in communication with exhaust treatment component 20. Although outlet 48 is illustrated as being directly connected to exhaust treatment component 20, it should be understood that an additional conduit (not shown) may be positioned between outlet 48 and exhaust treatment component 20. The additional conduit can be non-linear such that the flow of exhaust through the conduit must turn before entering exhaust treatment component 20. Housing 44 can be cylindrically-shaped and may include a first section 50 supporting a DOC 52, and a second section 54 supporting DPF 56. Although DOC 52 is illustrated as being upstream of DPF 56, it should be understood that DPF 56 can be positioned upstream of DOC 52 without departing from the scope of the present disclosure. Opposing ends of housing 44 can include end caps 58 and 60 to hermetically seal housing 44. End caps 58 and 60 can be slip-fit and welded to first and second sections 50 and 54, respectively. First and second sections 50 and 54 may be secured by clamps 62. The use of clamps 62 allows for easy removal of DOC 52 or DPF 56 for maintenance, cleaning, or replacement of these components. Exhaust from exhaust passage 14 will enter inlet 46, pass through DOC 52 and DPF 56, and exit outlet 48 before entering exhaust treatment component 20.

Exhaust treatment component 20 is substantially similar to exhaust treatment component 18. In this regard, exhaust treatment component 20 may include a housing 64, an inlet 66, and an outlet 68. Inlet 66 communicates with outlet 48 of exhaust treatment component 18, and outlet 68 may be in communication with a downstream section of exhaust passage 14.

Housing 64 can be cylindrically-shaped and may support an SCR 70 and ammonia slip catalyst 72. SCR is preferably located upstream of ammonia slip catalyst 72. Opposing ends of housing 64 can include end caps 74 and 76 to hermetically seal housing 64. End caps 74 and 76 can be slip-fit and welded to housing 64. Alternatively, end caps 74 and 76 can be secured to housing 64 by clamps (not shown). Exhaust from outlet 48 of exhaust treatment component 18 will enter inlet 66, pass through SCR 70 and ammonia slip catalyst 72, and exit outlet 68 before entering the downstream section of exhaust passage 14.

Dosing module 28 may be positioned on end cap 74 at a location proximate inlet 66. Dosing module 28 is operable to inject a reductant such as a urea exhaust treatment fluid into the exhaust stream before the exhaust stream passes through SCR 70. A sufficient intermingling of the exhaust and exhaust treatment fluid should occur to optimize the removal of $NO_x$ from the exhaust stream during as the mixture passes through SCR 70. To assist in intermingling of the exhaust stream and the urea exhaust treatment fluid, a mixing assembly 80 may be positioned downstream from inlet 66 and upstream of SCR 70. Mixing assembly 80 is positioned proximate dosing module 28 such that dosing module 28 may dose the urea exhaust treatment fluid directly into mixing assembly 80 where it may intermingle with the exhaust stream.

Figure 7:
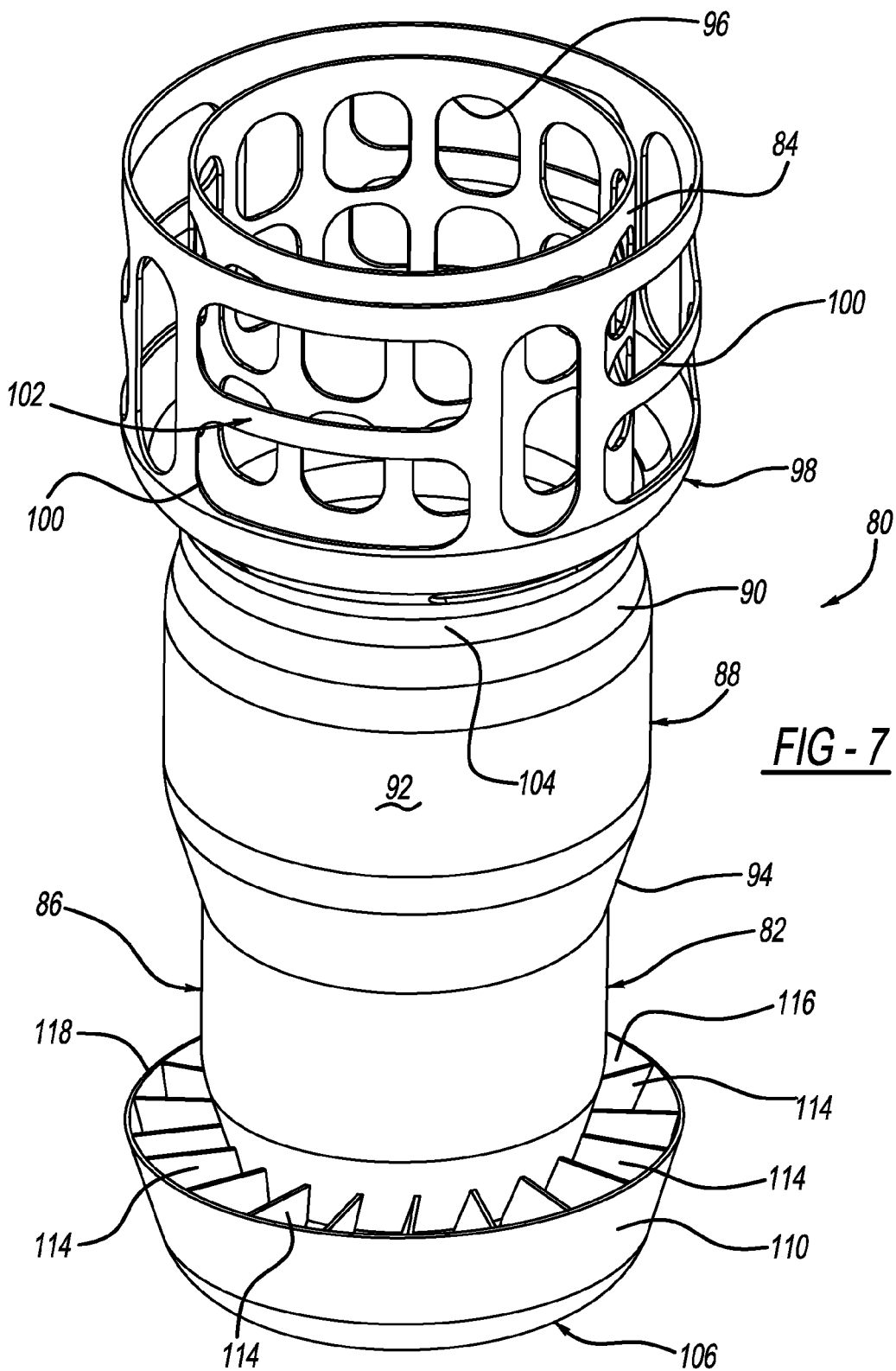
FIG. 7 is a perspective view of a mixing assembly according to a first exemplary embodiment of the present disclosure.
Figure 8:
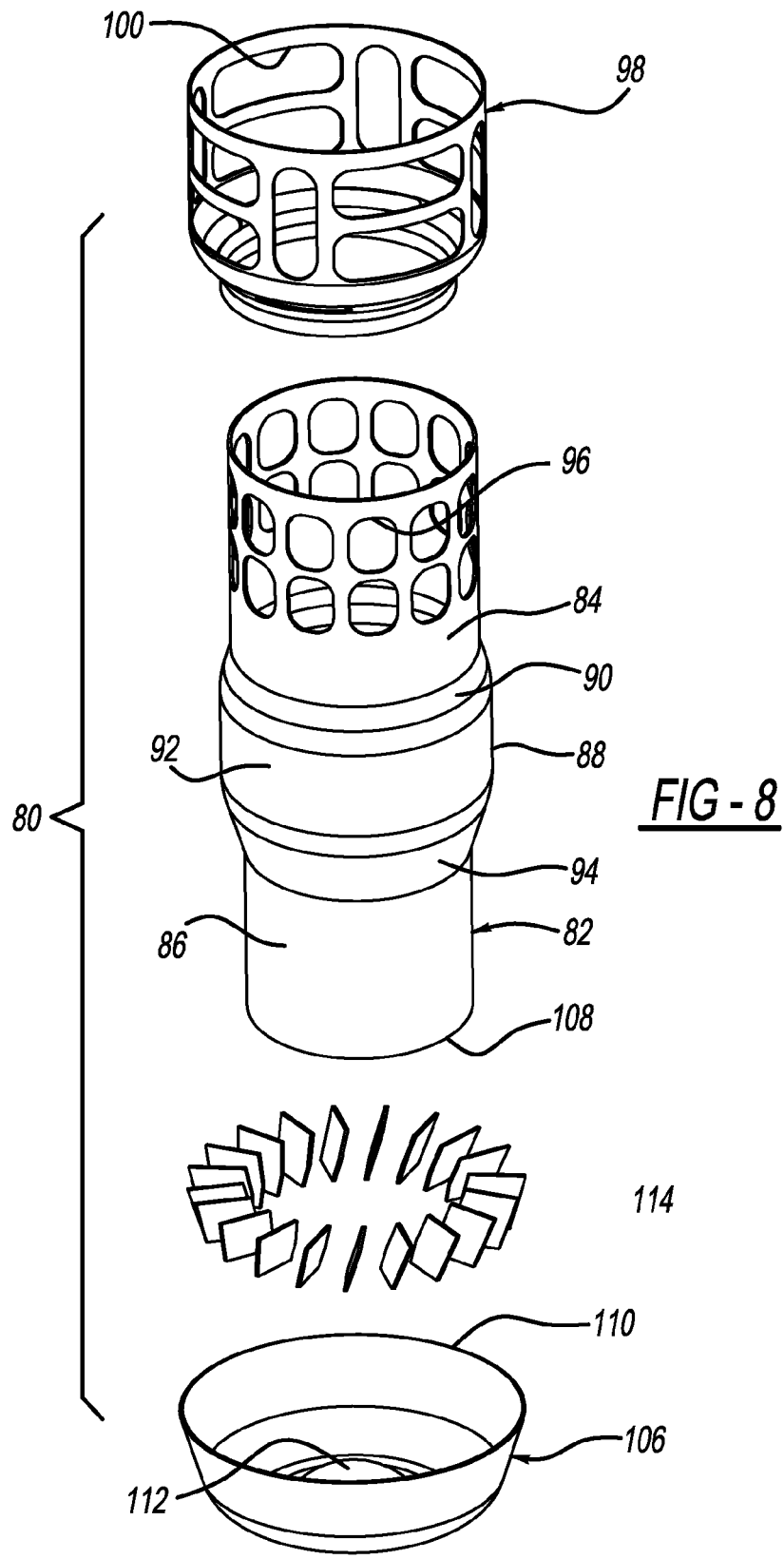
FIG. 8 is an exploded perspective view of the mixing assembly illustrated in FIG. 7.
Figure 9:
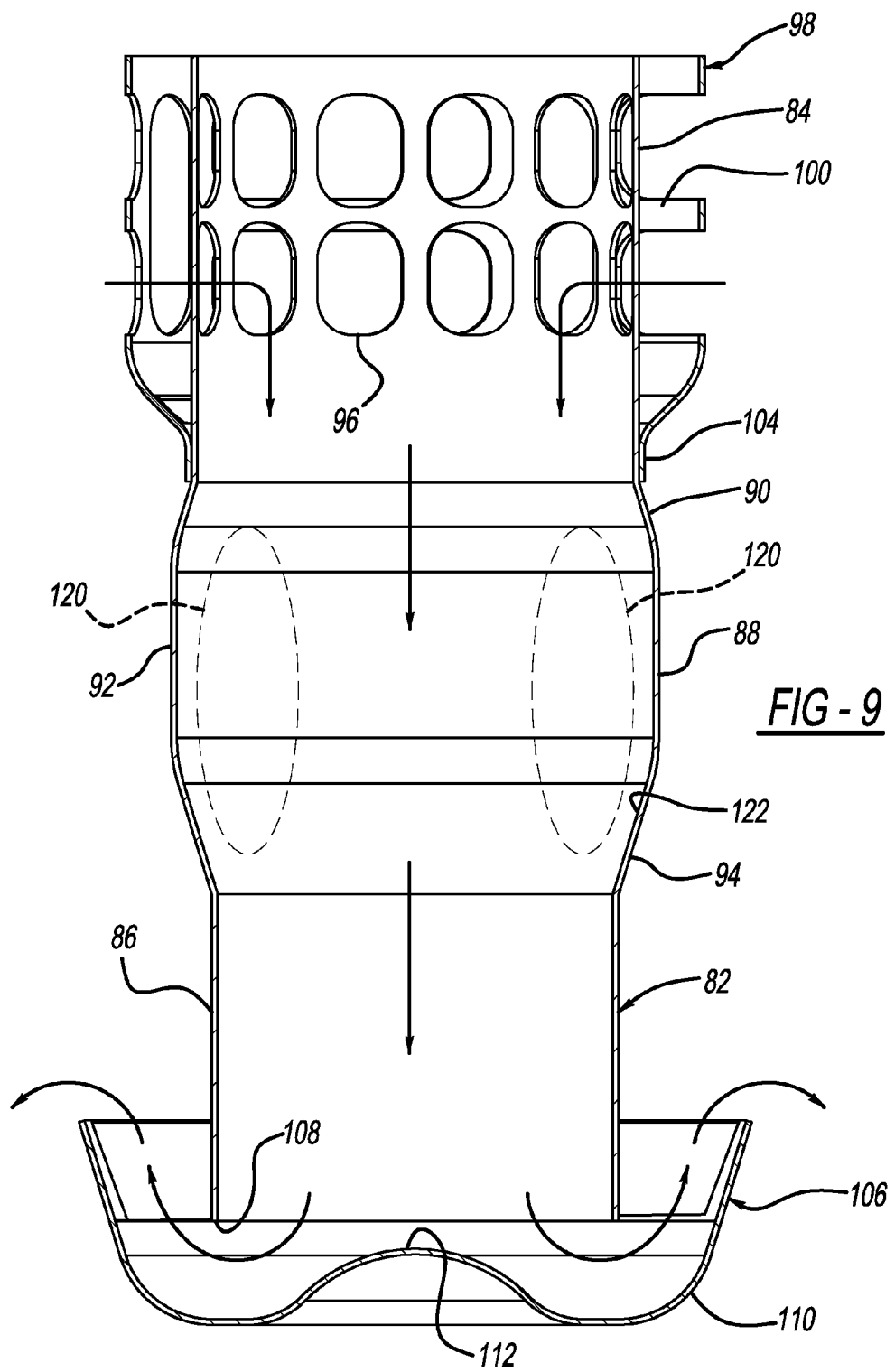
FIG. 9 is a cross-sectional view of the mixing assembly illustrated in FIG. 7.

FIGS. 7-9 illustrate a first exemplary embodiment of mixing assembly 80. Mixing assembly 80 includes a decomposition tube 82 including a first end portion 84 that may be secured to end cap 74 and a second end portion 86 that is positioned proximate SCR 70. Decomposition tube 82 may be substantially cylindrical, with a radially expanded portion 88 positioned between the first and second end portions 84 and 86. Radially expanded portion 88 includes a conically-expanding portion 90 that expands the decomposition tube 82, a cylindrical portion 92 downstream from the conically-expanding portion 90 having a diameter that is greater than that of first and second end portions 84 and 86, and a conically-narrowing portion 94 that narrows decomposition tube 82. It should be understood that first and second end portions 84 and 86 may have different diameters, without departing from the scope of the present disclosure. It should also be understood that the present disclosure does not require conically-narrowing portion 94. That is, radially expanded portion 88 may extend over the entire length of second end portion 86.

First end portion 84 may be perforated such that first end portion 84 includes a plurality of first perforations 96. First perforations 96 can vary in size around the circumference of first end portion 84, and assist in creating turbulence and increasing a velocity of the exhaust stream as it enters decomposition tube 82. Although not required by the present disclosure, a perforated collar 98 including a plurality of second perforations formed as elongate slots 100 may be positioned around and secured to first end portion 84. Perforated collar 98 includes a cylindrical portion 102 having a diameter greater than that of first end portion 84. Cylindrical portion 102 radially narrows into an axially-extending flange 104 that may be fixedly coupled to decomposition tube 82 at a position proximate radially expanded portion 88 by welding, brazing, or any other secure attachment method known to one skilled in the art.

Elongate slots 100 may be dimensioned larger than first perforations 96. Elongate slots 100 can be oriented in various directions including directions parallel with an axis of decomposition tube 82, and directions arranged orthogonal to the axis of decomposition tube 82. It should be understood, however, that each elongate slot 100 can be oriented in the same direction without departing from the scope of the present disclosure. Similar to first perforations 96, elongate slots 100 assist in creating turbulence and increasing a velocity of the exhaust stream as it enters decomposition tube 82.

Mixing assembly 80 includes a flow reversing device 106 at second end portion 86. Flow reversing device 106 may be fixed to second end portion 86, or may be supported by a baffle (not shown) that secures flow reversing device 106 to end cap 74 at a position proximate terminal edge 108 of second end portion 86. Flow reversing device 106 is a substantially cup-shaped member 110 having a central bulge 112 formed therein. Flow reversing device 106 has a diameter greater than that of second end portion 86 of decomposition tube 82 such that as the exhaust flow enters the cup-shaped member 110, the exhaust flow will be forced to flow in a reverse direction back toward inlet 66 of housing 64. The reversing of the exhaust flow assists in intermingling of the reagent exhaust treatment fluid and the exhaust stream before the exhaust stream reaches SCR 70.

Flow reversing device 106 may include a plurality of deflecting members 114 to further assist in intermingling the reagent exhaust treatment fluid and the exhaust stream. Deflecting members 114 may be formed as a plurality of vanes that extend radially inward from an inner surface 116 of outer wall 118 of flow reversing device 106. In addition to extending radially inward, vanes 114 may also be angled relative to an axis of decomposition tube 82 to further direct the exhaust flow as it exits flow reversing device 106. Vanes 114 may be planar members, or may be slightly curved. Although vanes 114 are illustrated as being secured to inner surface 116 of flow-reversing device 106, it should be understood that vanes 114 may be secured to second end portion 86 of decomposition tube 82.

Figure 6:
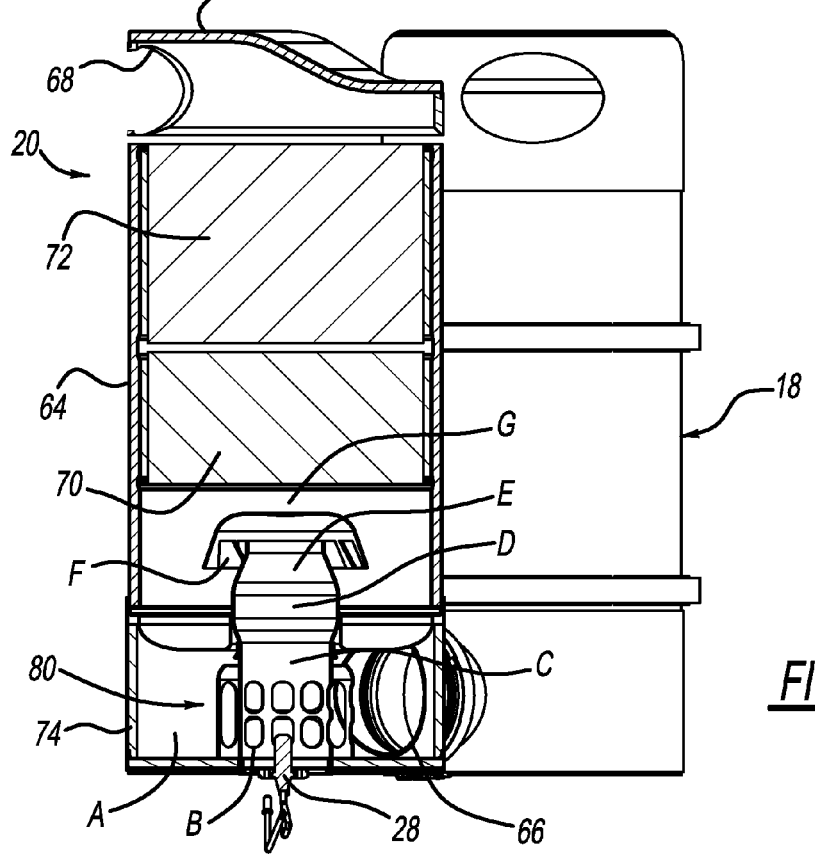
FIG. 6 is a cross-sectional view along line 6-6 in FIG. 4.

As illustrated in FIG. 6, mixing assembly 80 may be arranged in a direction orthogonal to an axis of inlet 66. The exhaust stream, therefore, will enter mixing assembly 80 orthogonally before being directed toward SCR 70. As the exhaust stream enters first end 84 of decomposition tube 82, a velocity of the exhaust stream may increase and the flow of the exhaust stream will become tortuous due to first and second perforations 96 and 100. As the exhaust enters radially expanded portion 88, the flow may tend to stay along the axis of the decomposition tube 82. Although the velocity of the exhaust stream may slow, the velocity only slows to a minimal extent that ensures satisfactory intermingling of the exhaust and reagent exhaust treatment fluid. In this regard, radially expanded portion 88 diffuses the turbulence in the exhaust flow created by perforations 96 and 100, which aids in minimizing any potential loss in velocity. Table 1, below, summarizes the peak velocity of the exhaust stream at various regions within exhaust treatment component 20.

TABLE 1

| Region | Peak Velocity (m/S) |
|---|---|
| A | 84 |
| B | 120 |
| C | 102 |
| D | 102 |
| E | 120 |
| F | 120 |
| G | 25 |

As can be seen in Table 1 and FIG. 6, as the exhaust stream enters from inlet 66, the exhaust may have a peak velocity of 84 m/s (Region A). As the exhaust enters mixing assembly 80 through collar 98 and first end portion 84 of decomposition tube 82, the velocity may increase (Region B). The increase in velocity at region B creates a large velocity differential between a velocity of the exhaust treatment fluid injected by dosing module 28 and the exhaust gas flowing through perforations 96 and 100. The velocity differential of the bulk exhaust flow results in aerodynamic forces greater than the surface tension characteristic of the exhaust treatment fluid, which leads to droplet breakup and atomization of the exhaust treatment fluid.

Then, as the exhaust enters radially expanded portion 88, the exhaust may slightly slow (Regions C and D). As the exhaust exits radially expanded portion and enters flow reversing device 106, the velocity may then increase (Regions E and F). The exhaust velocity may then decrease as the exhaust reaches SCR 70 (Region G). Because the exhaust velocity increases at a location (Region B) where the exhaust treatment fluid is dosed into the exhaust stream, and increases as it exits flow reversing device 106, the exhaust and exhaust treatment fluid can be sufficiently intermingled to ensure satisfactory atomization of the exhaust treatment fluid.

Regardless, while the exhaust stream is in radially expanded portion 88 (Region D), zones 120 of low velocity flow are present at positions adjacent inner walls 122 of decomposition tube 82 (FIG. 9). These zones 120 surround the exhaust stream as it passes through radially expanded portion 88, and assist in preventing wetting of inner walls 122 with the reagent exhaust treatment fluid. The prevention of the inner walls 122 being wetted prevents, or at least substantially minimizes, the build-up of solid urea deposits on the inner walls 122.

As the exhaust stream enters second end portion 86 of decomposition tube 82, a velocity of the exhaust stream will again increase and remain increased as it enters and exits flow reversing device 106. Upon entry into flow reversing device 106, the flow direction of the exhaust stream will be reversed back toward inlet 66. As the exhaust flow exits flow reversing device 106, the exhaust will be directed by vanes 114, which will assist in further intermingling of the exhaust and reagent exhaust treatment fluid. Additionally, the exhaust stream may impinge upon conically-narrowing portion 94 of decomposition tube 82, which can further assist in directing the exhaust stream away from mixing assembly 80. The exhaust stream is then free to flow towards SCR 70. It should be understood that the above-noted velocities may vary in later-described embodiments. In this regard, the velocities may be increased anywhere from 10%-20%.

Figure 12:
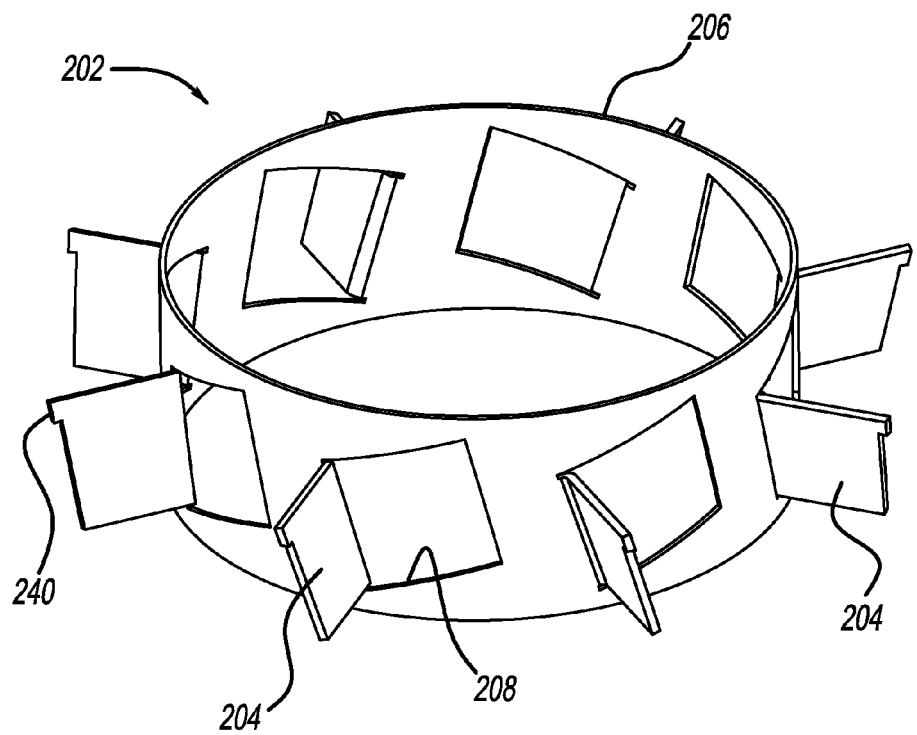
FIG. 12 is a perspective view of the dispersion device illustrated in FIG. 11 in an assembled state.
Figure 13:
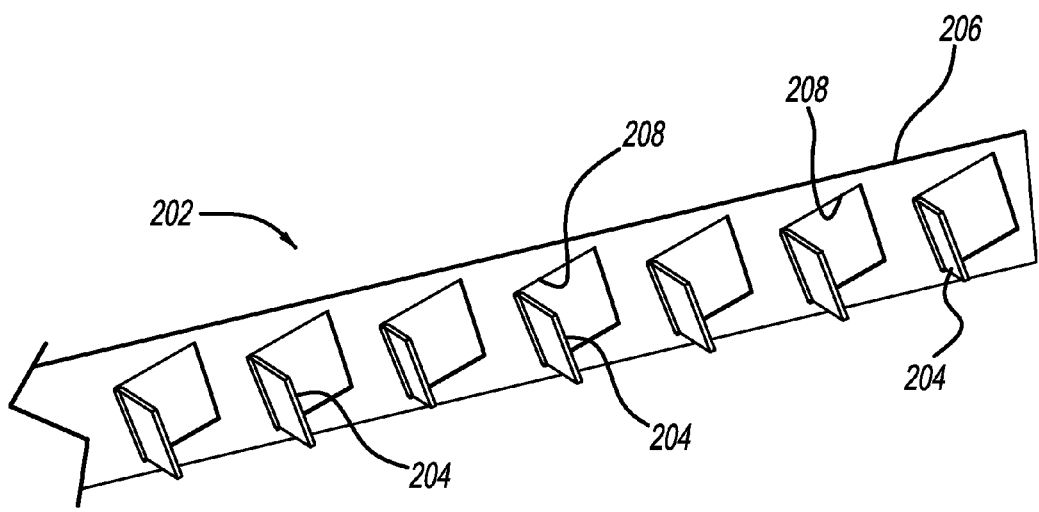
FIG. 13 is another perspective view of the dispersion device illustrated in FIG. 11 in an un-assembled state.

Now referring to FIGS. 10 to 13, a second exemplary mixing assembly 200 will be described. Mixing assembly 200 is similar to mixing assembly 80 illustrated in FIGS. 7 to 9. Description of components that are common to each assembly, therefore, is omitted herein for clarity. Mixing assembly 200 includes deflecting device 202 including a plurality of deflecting members 204. As best shown in FIG. 13, deflecting device 202 may be formed from an elongate strip 206 of metal such as aluminum, steel, titanium, or any other material known to one skilled in the art. Deflecting members 204 are integral (i.e., unitary) with elongate strip 206 and are formed as planar tabs that are bent radially outward from elongate strip 206 from a plurality of cut-outs 208 formed in elongate strip 206.

Deflecting members 204 may be designed to function in a manner similar to vanes 114. In this regard, as the exhaust flow exits flow reversing device 106, the exhaust will be directed by deflecting members 204, which will assist in further intermingling of the exhaust and reagent exhaust treatment fluid. As best shown in FIGS. 12 and 13, cut-outs 208 are angled relative to a length of elongate strip 206. When deflecting members 204 are bent outward from elongate strip 206, deflecting members 204 will also be angled relative to an axis of mixing assembly 200, which may be used to direct the exhaust flow in predetermined directions upon exiting flow reversing device 106.

Deflecting members 204 may have a length that is substantially equal to a distance between second end portion 86 of decomposition tube 82 and outer wall 118 of flow reversing device 106. Alternatively, deflecting members 204 may have a length that is less than the distance between second end portion 86 and outer wall 118. In another alternative, deflecting members 204 may each have a terminal projection 210 that provides deflecting members 204 with a length that is greater than the distance between second end portion 86 and outer wall 118. Terminal projection 210 may then abut a terminal end 212 of outer wall 118 of flow reversing device 106, which assists in positioning deflecting device 202 relative to flow reversing device 106. Terminal projections 210 may also assist in securing deflecting device 202 to flow reversing device 106, by providing a location to weld, braze, or secure each tab to flow reversing device 106, if desired.

Figure 14:
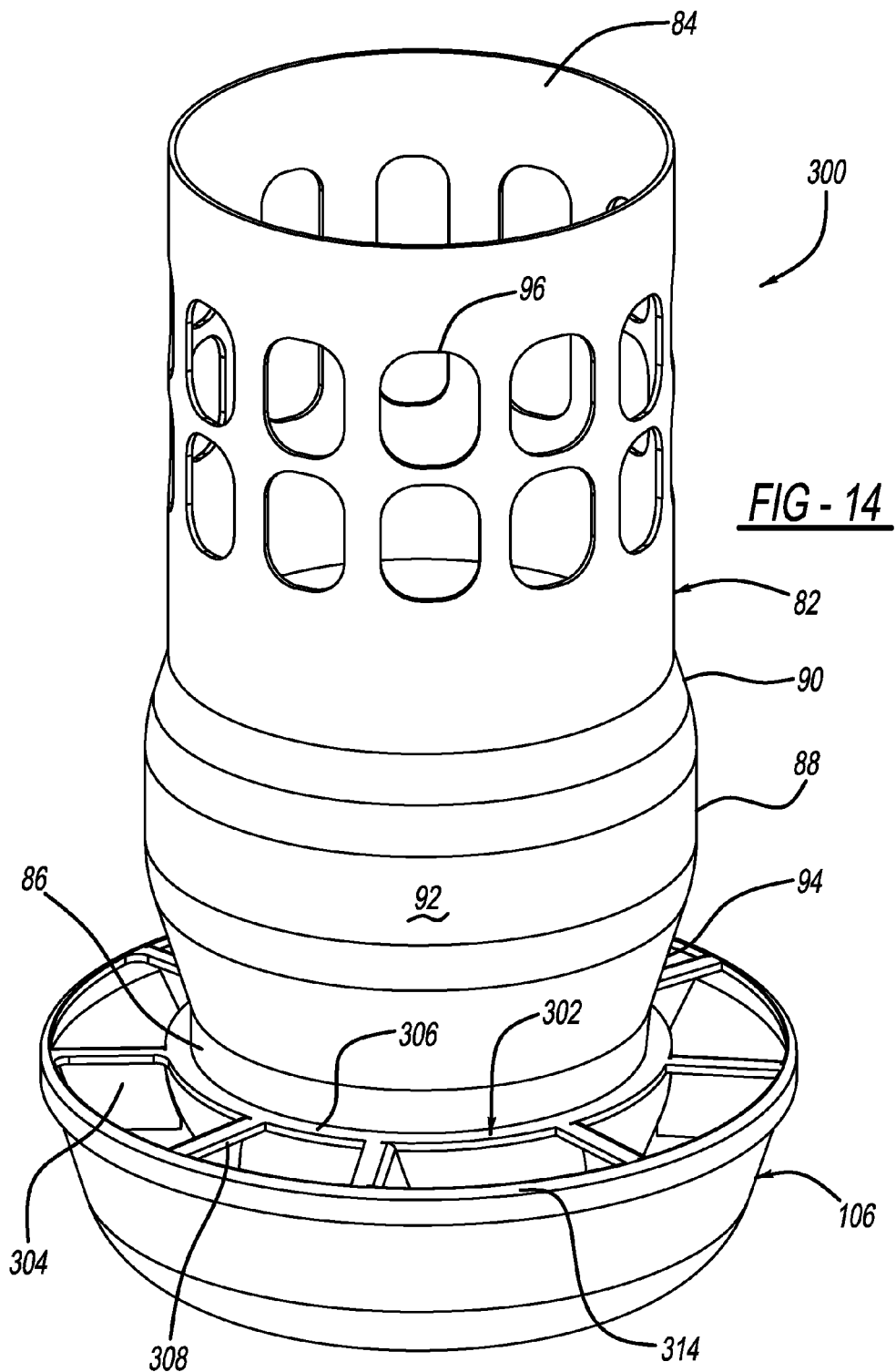
FIG. 14 is a perspective view of a mixing assembly according to a third exemplary embodiment of the present disclosure.
Figure 15:
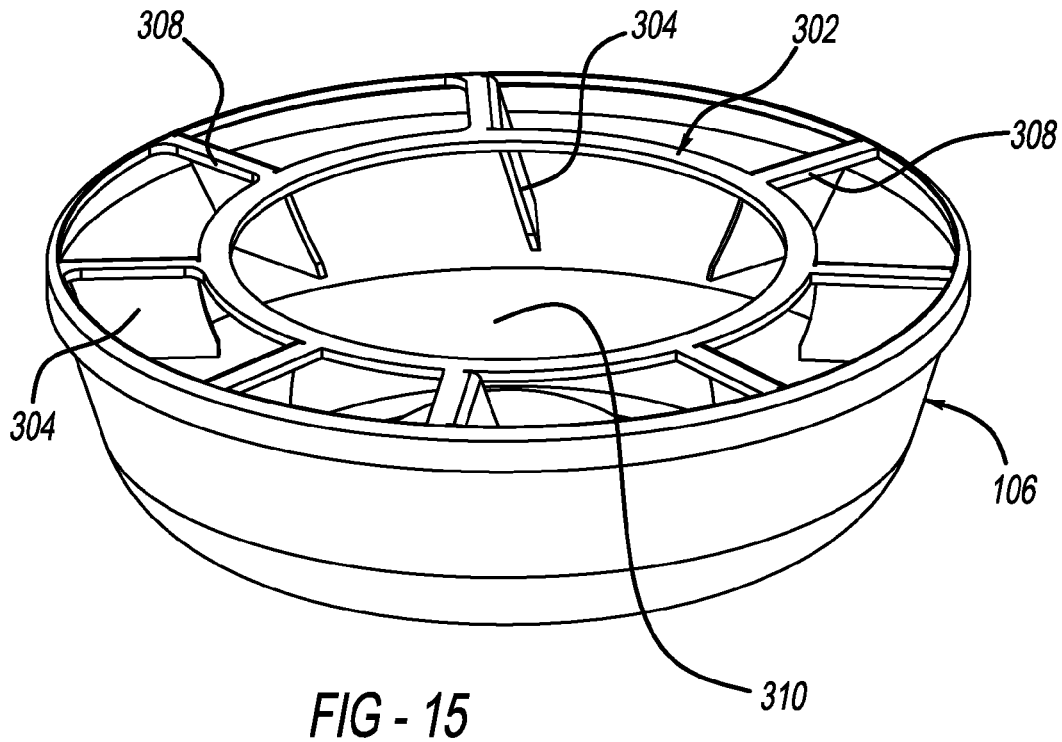
FIG. 15 is a perspective view of a flow-reversing device and dispersion device of the mixing assembly illustrated in FIG. 14.
Figure 16:
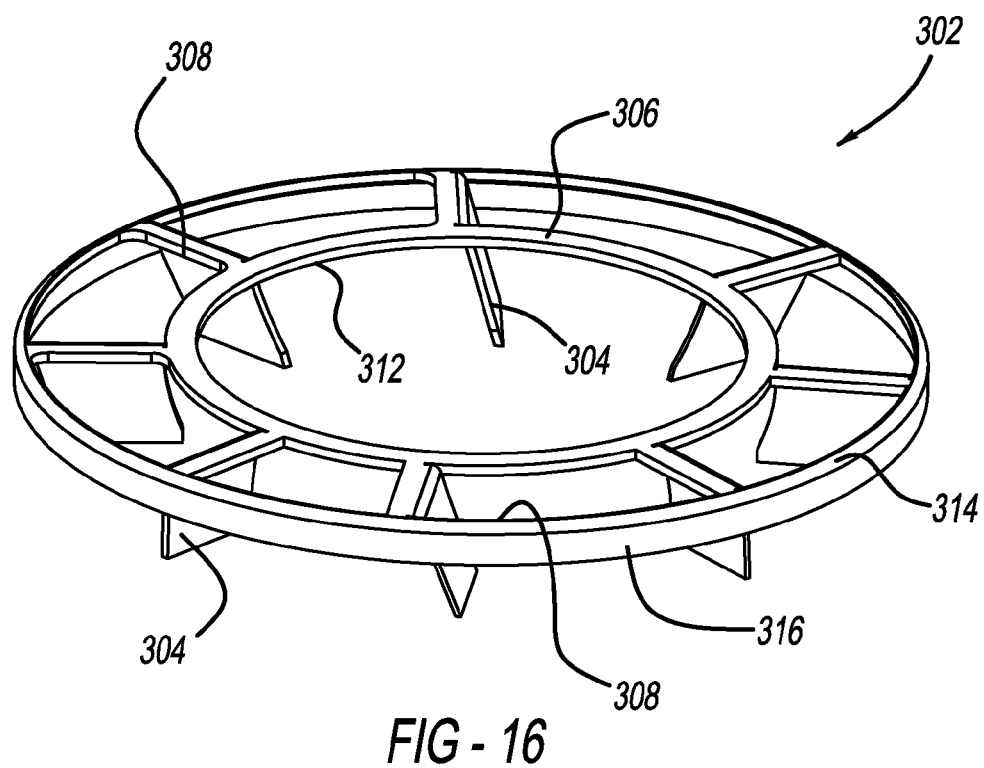
FIG. 16 is a perspective view of the dispersion device illustrated in FIG. 15.

Now referring to FIGS. 14 to 16, a third exemplary mixing assembly 300 is illustrated. Mixing assembly 300 is substantially similar to mixing assembly 80 illustrated in FIGS. 7 to 9. Description of components that are common to each assembly, therefore, is omitted herein for clarity. Although collar 98 is not illustrated in FIG. 14, it should be understood that mixing assembly 300 may include collar 98. Mixing assembly 300 includes deflecting device 302 including a plurality of deflecting members 304. As best shown in FIG. 15, deflecting device 302 may be formed from an annular ring 306 of metal such as aluminum, steel, titanium, or any other material known to one skilled in the art. Deflecting members 304 are integral (i.e., unitary) with annular ring 306 and are formed as planar tabs that may be bent axially outward from annular ring from a plurality of cut-outs 308 formed in annular ring 306. Although deflecting members 304 are illustrated as being bent in a direction toward an interior 310 of flow reversing device 106, it should be understood that deflecting members 304 can be bent in a direction away from interior 310.

Deflecting members 304 may be designed to function in a manner similar to vanes 114. In this regard, as the exhaust flow exits flow reversing device 106, the exhaust will be directed by deflecting members 304, which will assist in further intermingling of the exhaust and reagent exhaust treatment fluid. Deflecting members 304 may also be angled relative to an axis of mixing assembly 300, which may be used to direct the exhaust flow in predetermined directions upon exiting flow reversing device 106.

Once deflecting members 304 are bent into the desired orientation, an inner ring 312 and an outer ring 314 of deflecting device will be defined. Inner ring 312 may be used to secure deflecting device 302 to second end portion 86 of decomposition tube 82 by welding, brazing, or any other fixing method known in any manner known to one skilled in the art. Deflecting device 302 may also include an axially-extending flange 316 that extends outward from outer ring 314. Axially-extending flange 316 may correspond to terminal end 212 of flow reversing device 106 (FIG. 11), and overlap terminal end 212 such that axially-extending flange 316 may be secured to flow reversing device 106 by welding, brazing, or any other attachment method known.

Figure 17:
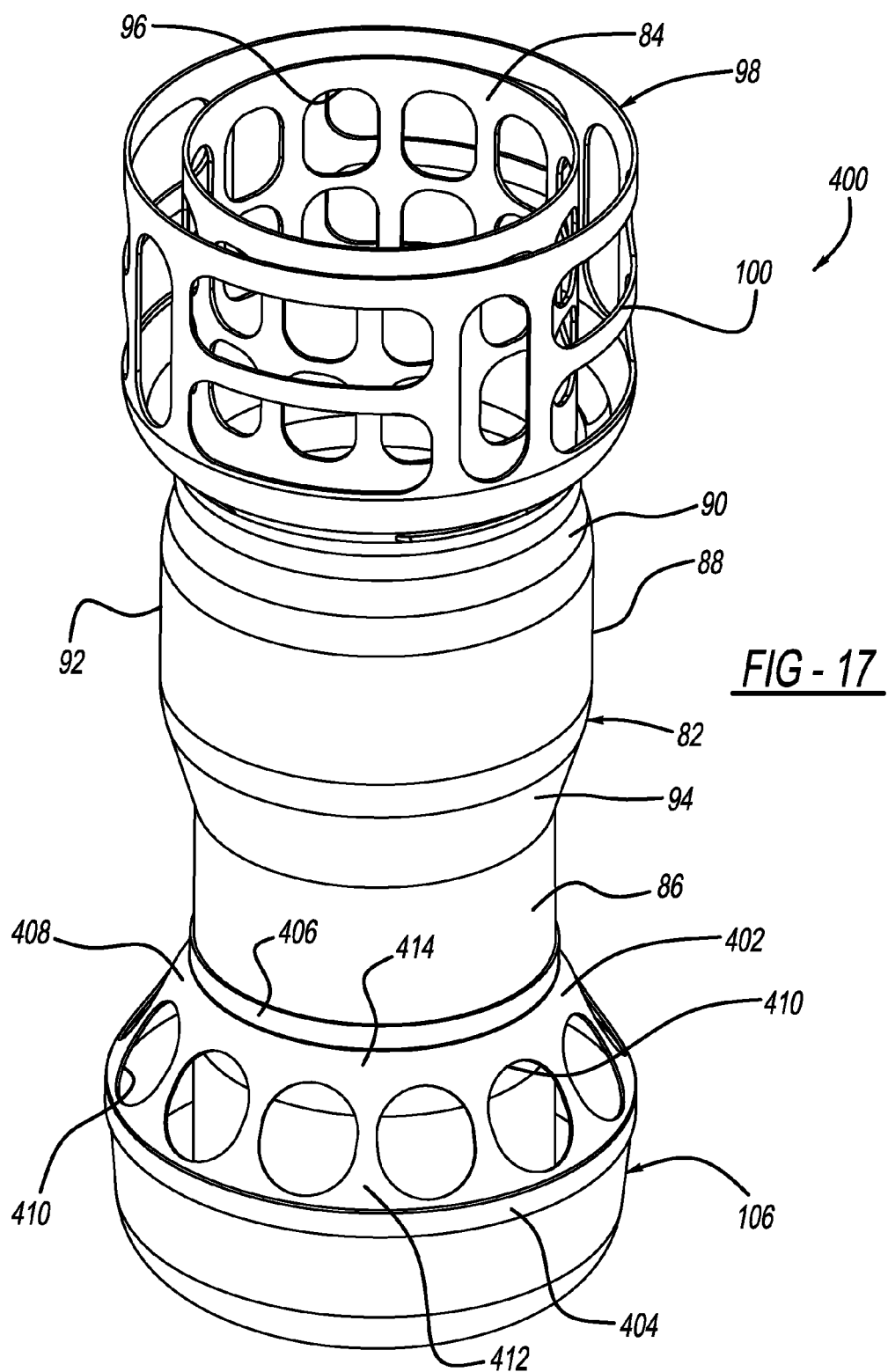
FIG. 17 is a perspective view of a mixing assembly according to a fourth exemplary embodiment of the present disclosure.
Figure 18:
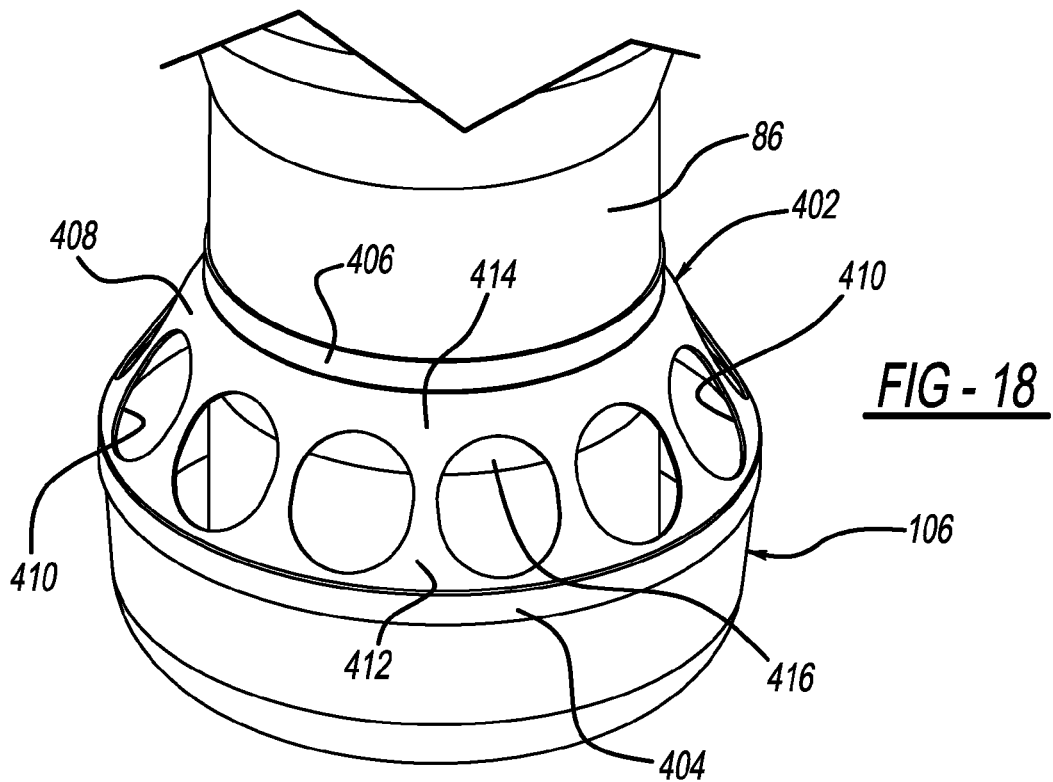
FIG. 18 is a partial-perspective view of the mixing assembly illustrated in FIG. 17.
Figure 19:
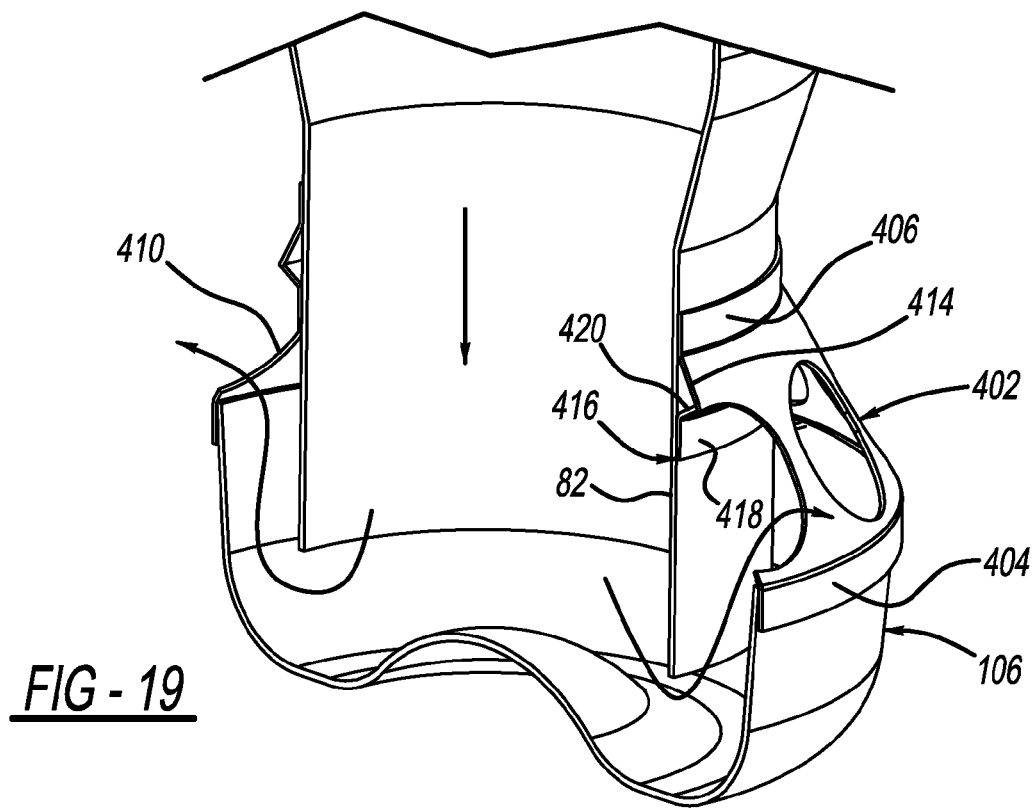
FIG. 19 is a perspective cross-sectional view of FIG. 17.

Now referring to FIGS. 17 to 19, a fourth exemplary embodiment is illustrated. Mixing assembly 400 is similar to mixing assembly 80 illustrated in FIGS. 7 to 9. Description of components that are common to each assembly, therefore, is omitted herein for clarity. Mixing assembly 400 includes flow reversing device 106 at second end portion 86, which is a substantially cup-shaped member having a central bulge formed therein. In contrast to deflecting members 204 and 304 described above, mixing assembly 400 may include a flow-dispersing cap 402 coupled between flow reversing device 106 and decomposition tube 82.

Flow-dispersing cap 402 includes a first axially-extending lip 404 that couples flow-dispersing cap 402 to flow reversing device 106, and a second axially-extending lip 406 that couples flow-dispersing cap 402 to decomposition tube 82. Between axially-extending lips 404 and 406 is a perforated conically-shaped ring 408 having a plurality of through-holes 410. Similar to first and second perforations 96 and 100, through-holes 410 assist in creating turbulence and increasing a velocity of the exhaust stream as it exits flow reversing device 106. Through-holes 410 can be sized and shaped in any manner desired. In this regard, although through-holes 410 are illustrated as being circular, it should be understood that through-holes can be any shape including square, rectangular, triangular, oval, and the like. Conically-shaped ring 408 can include a first portion 412 adjacent first axially-extending lip 404, and a second portion 414 adjacent second axially-extending lip 406.

A diverter ring 416 may be positioned between second portion 414 and decomposition tube 82. As best shown in FIG. 19, diverter ring 416 includes a cylindrical portion 418 coupled to decomposition tube 82, and an angled flange 420 extending away from cylindrical portion 418 between decomposition tube 82 and conically-shaped ring 408. Angled flange 420 may be positioned at any angle desired to further assist in diverting flow out from mixing assembly 400. In this regard, angled flange may be angled relative to cylindrical portion 418 in the range of 25 to 75 degrees, preferably in the range of 35 to 65 degrees, and most preferably at an angle of 50 degrees.

Upon entry into flow reversing device 106, the flow direction of the exhaust stream will be reversed back toward inlet 66. As the exhaust flow exits flow reversing device 106, the exhaust will be directed by diverter ring 416 out through through-holes 410, which will assist in further intermingling of the exhaust and reagent exhaust treatment fluid. The exhaust stream is then free to flow towards SCR 70.

Figure 20:
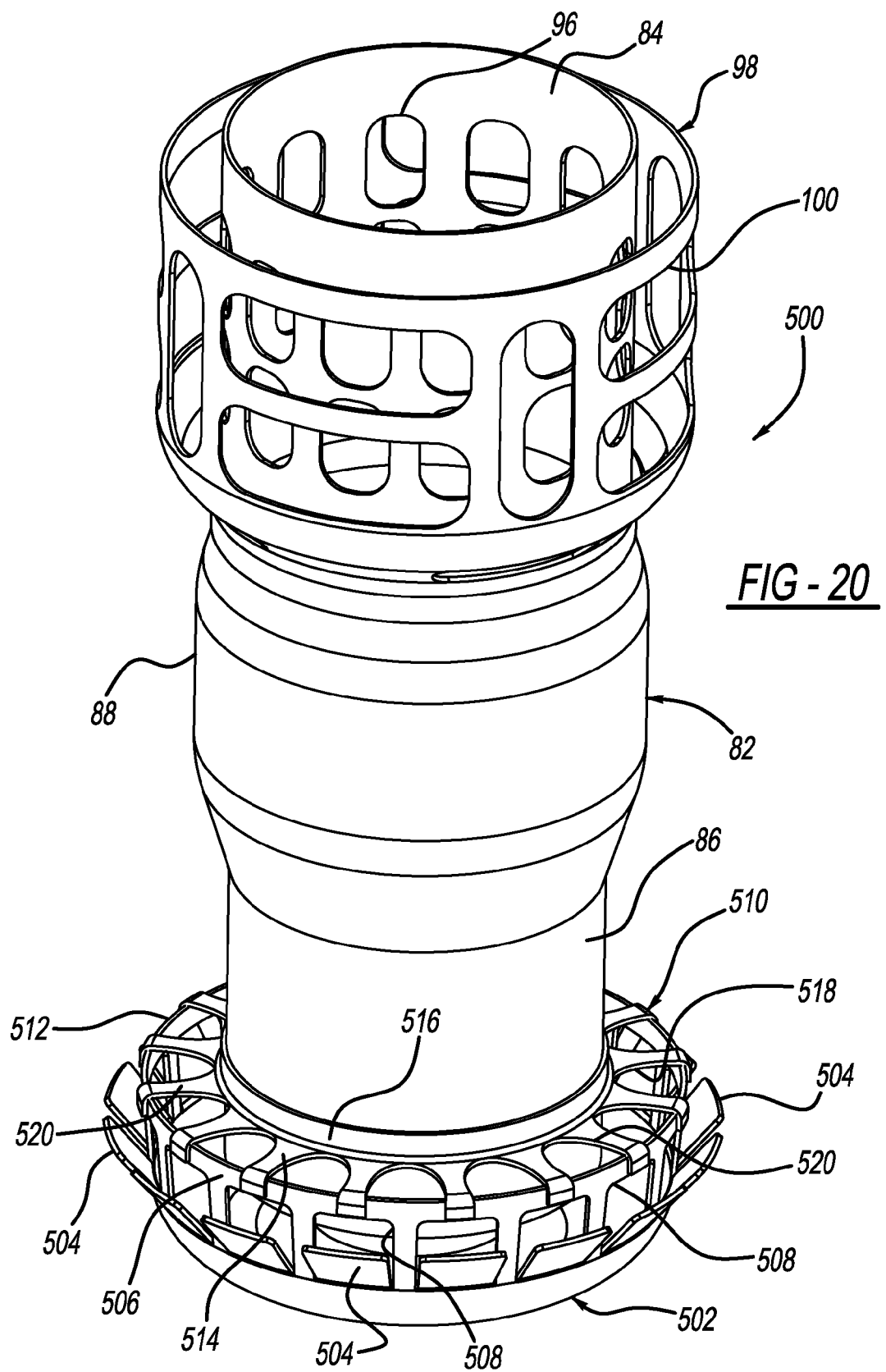
FIG. 20 is a perspective view of a mixing assembly according to a fifth exemplary embodiment of the present disclosure.
Figure 21:
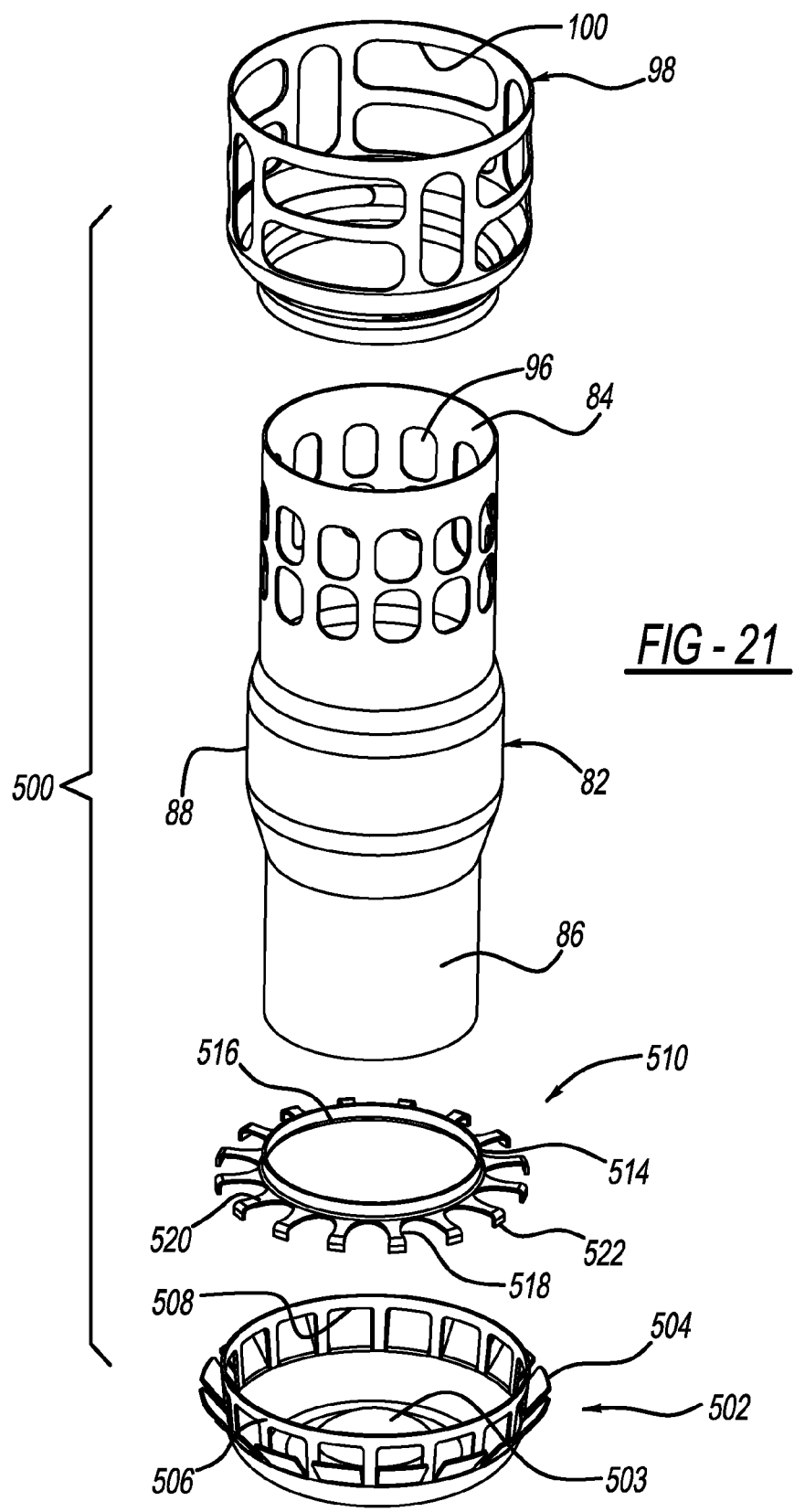
FIG. 21 is an exploded perspective view of the mixing assembly illustrated in FIG. 10.

Now referring to FIGS. 20 and 21, a fifth exemplary embodiment is illustrated. Mixing assembly 500 is substantially similar to mixing assembly 80 illustrated in FIGS. 7 to 9. Description of components that are common to each assembly, therefore, is omitted herein for clarity. Mixing assembly 500 includes flow reversing device 502 at second end portion 86 of decomposition tube 82, which is a substantially cup-shaped member having a central bulge 503 formed therein. Flow reversing device 502 may include a plurality of flow deflecting members 504 formed in an outer wall 506 thereof. Deflecting members 504 are integral (i.e., unitary) with flow reversing device 502 and are formed as planar tabs that are that are bent radially outward from outer wall 506 from a plurality of cut-outs 508 formed in outer wall 506. Deflecting members 504 may be designed to function in a manner similar to vanes 114. In this regard, as the exhaust flow exits flow reversing device 502 through cut-outs 508, the exhaust flow will become turbulent and deflected by deflecting members 504, which will assist in further intermingling of the exhaust and reagent exhaust treatment fluid.

Mixing assembly 500 may further include a dispersing ring 510 positioned between a terminal end 512 of flow reversing device 502 and decomposition tube 82. Dispersing ring 510 may be formed from an annular ring 514 of metal such as aluminum, steel, titanium, or any other material known to one skilled in the art. A cylindrical flange 516 may extend axially away from annular ring 514. Cylindrical flange 516 may be welded, brazed, or secured in any manner known, to decomposition tube 82. Annular ring 514 includes a plurality of scallop-shaped recesses 518 formed therein. Recesses 518 serve as exit ports to allow the exhaust stream to exit mixing assembly 500. Accordingly, the exhaust stream may exit through cut-outs 508, or may exit through recesses 518. Adjacent recesses 518 may be separated by a land portion 520 of the annular ring 514. A terminal end 522 of each land portion 520 located opposite to cylindrical flange 516 may be bent in the axial direction to provide an abutment surface that can position dispersing ring 510 relative to flow reversing device 502 before dispersing ring 510 is secured to decomposition tube 82.

Upon entry into flow reversing device 502, the flow direction of the exhaust stream will be reversed back toward inlet 66. As the exhaust flow exits flow reversing device 502, the exhaust may exit through cut-outs 508 and be deflected in a desired direction by deflecting members 504, or the exhaust stream may exit through recesses 518 formed in dispersing ring 510. Regardless of the location at which the exhaust stream exits mixing assembly 500, the exhaust stream is further intermingled with the reagent exhaust treatment fluid before flowing toward SCR 70.

Figure 22:
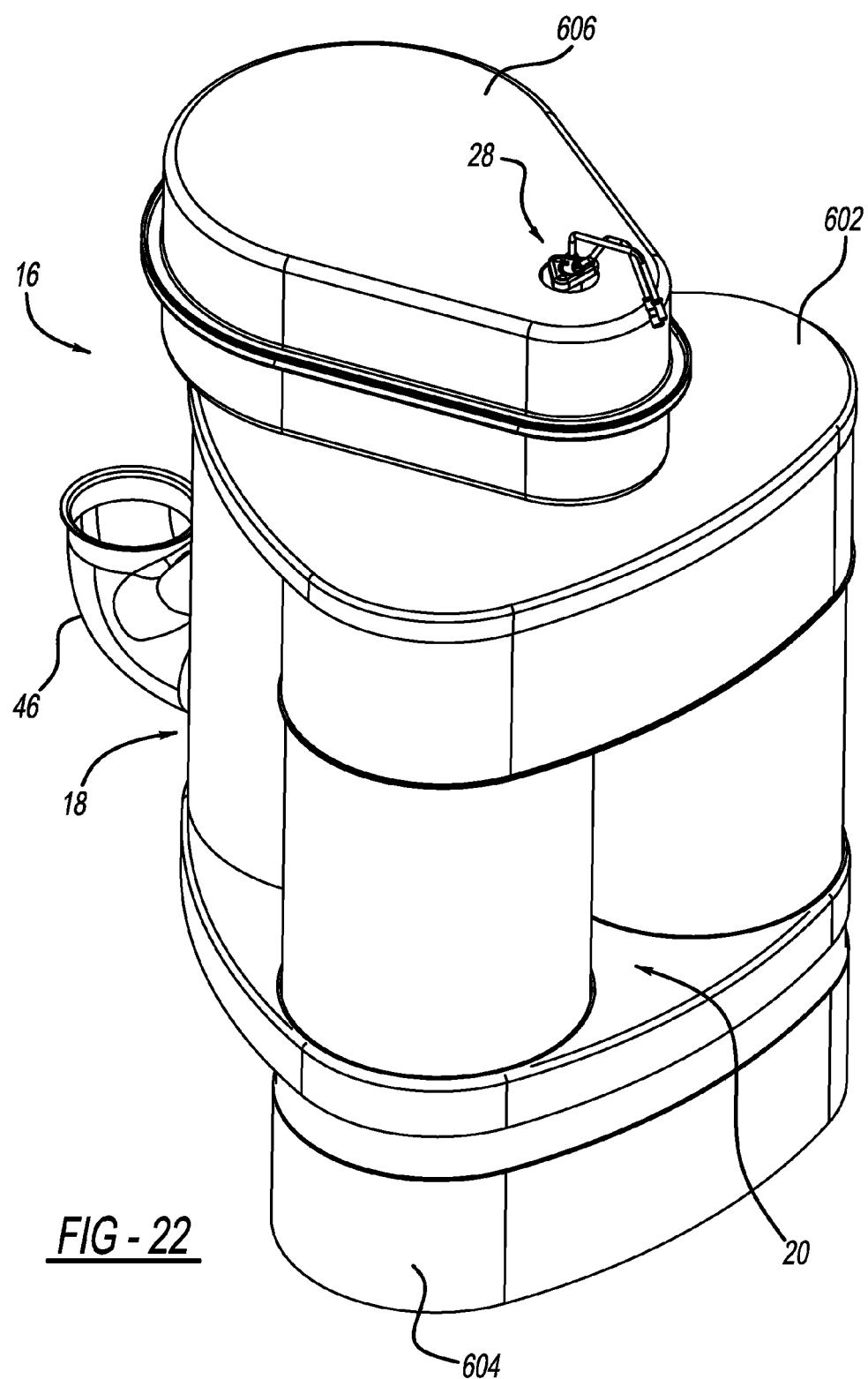
FIG. 22 is a perspective view of an exhaust treatment component according to a principle of the present disclosure.
Figure 23:
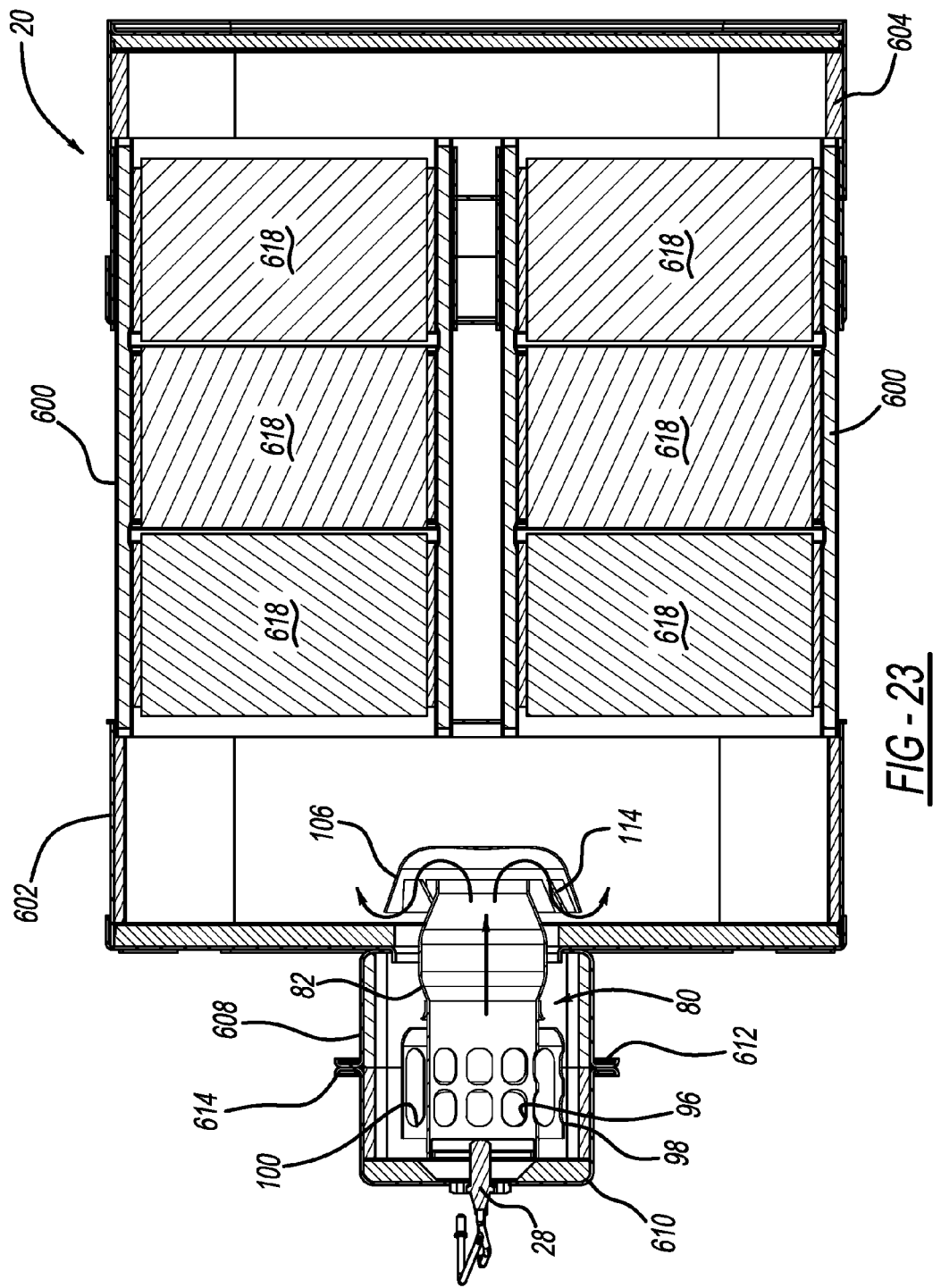
FIG. 23 is a cross-sectional view of the exhaust treatment component illustrated in FIG. 22.

Although each mixing assembly has been described relative to use in an exhaust treatment component 20 including a single SCR 70, the present disclosure should not be limited thereto. As best shown in FIGS. 22 and 23, mixing assemblies can be used in an exhaust treatment component 20 having a pair of SCRs 70. FIG. 22 illustrates a pair of exhaust treatment components 18 and 20, arranged in parallel. Exhaust treatment component 18 is similar to the previously-described embodiments so description thereof will be omitted.

Exhaust treatment component 20, as best shown in FIG. 23, includes mixing assembly 80 (or any other mixing assembly described above) for intermingling exhaust treatment fluid dosed into the exhaust stream by dosing module 28. Exhaust treatment component 20 includes a pair of housings 600 in communication with a pair of end caps 602 and 604. End caps 602 and 604 may be secured to housings 600 by welding, or may be secured to housings 600 by clamps (not shown). Mixing assembly 80 and dosing module 28 are secured in a conduit 606 that provides communication between exhaust treatment component 18 and exhaust treatment component 20. Conduit 606 may include a first portion 608 and a second portion 610 each including a flange 612 and 614, respectively, that may be secured by welding, or by a clamp (not shown). Each housing 600 supports a plurality of exhaust treatment component substrates 618, which may be a combination of SCRs, ammonia slip catalysts, and filters for treating the mixture of exhaust and exhaust treatment fluid.

As the exhaust enters mixing assembly 80, the urea exhaust treatment fluid may be dosed directly into mixing assembly 80 by dosing module 28. As the mixture of exhaust and exhaust treatment fluid travels through decomposition tube 82 and flow reversing device 106, the exhaust treatment fluid and exhaust stream will be sufficiently intermingled before passing through exhaust treatment component substrates 618. Mixing assembly 80 may include deflecting members or vanes 114 to assist in intermingling the exhaust and exhaust treatment fluid. Because a pair of housings 600 each including exhaust treatment component substrates 618 is used in the exemplary embodiment, vanes 114 may be positioned within flow reversing device 106 to ensure that a substantially equal amount of the exhaust stream is directed to each housing 600. That is, it should be understood that deflecting members 114 (and the deflecting members in each exemplary embodiment) can be oriented and positioned to direct the exhaust in the desired direction. In this manner, the exhaust can be properly treated by exhaust treatment component substrates 618.

Figure 24:
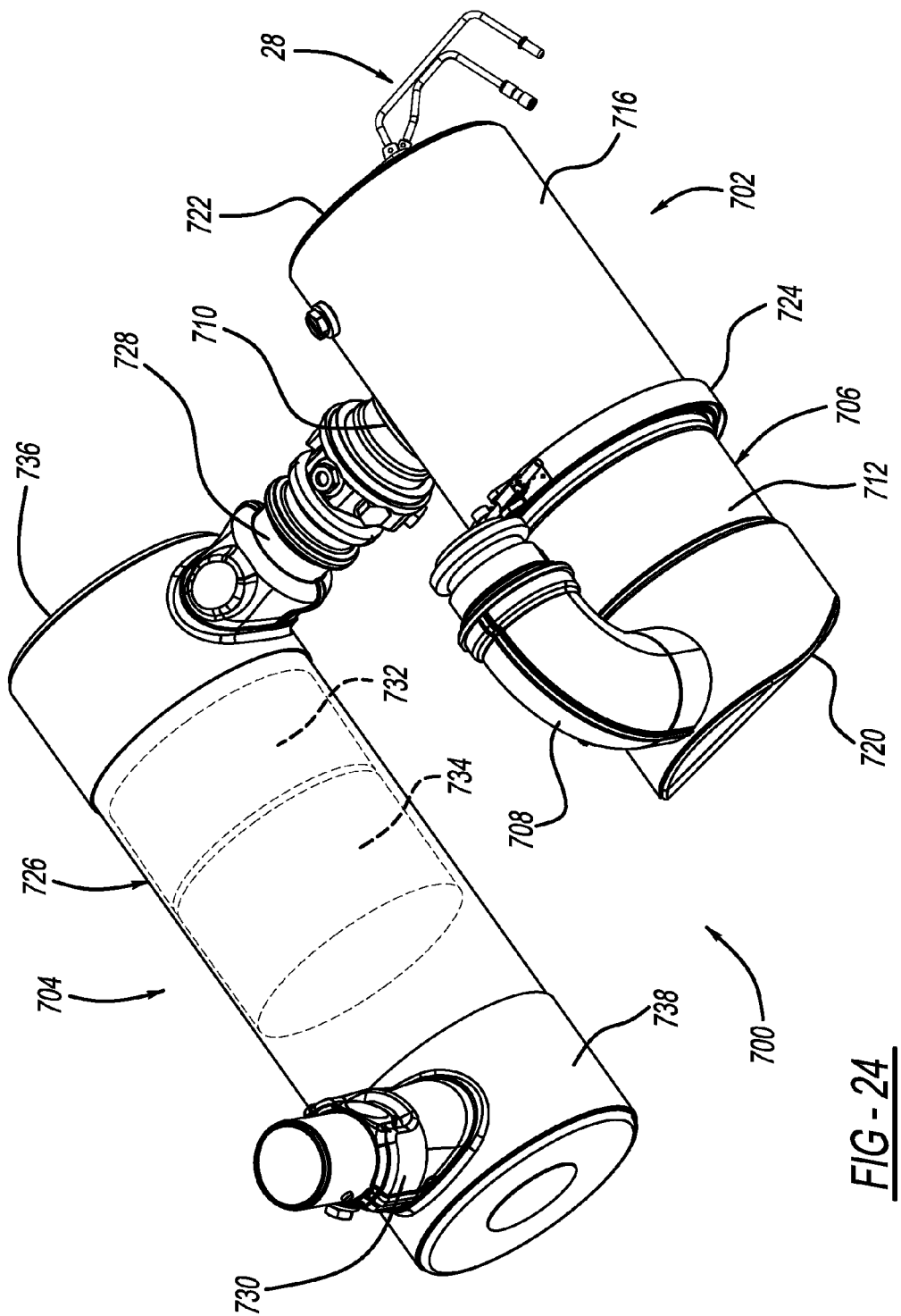
FIG. 24 is a perspective view of an exhaust after-treatment system according to a principle of the present disclosure.
Figure 25:
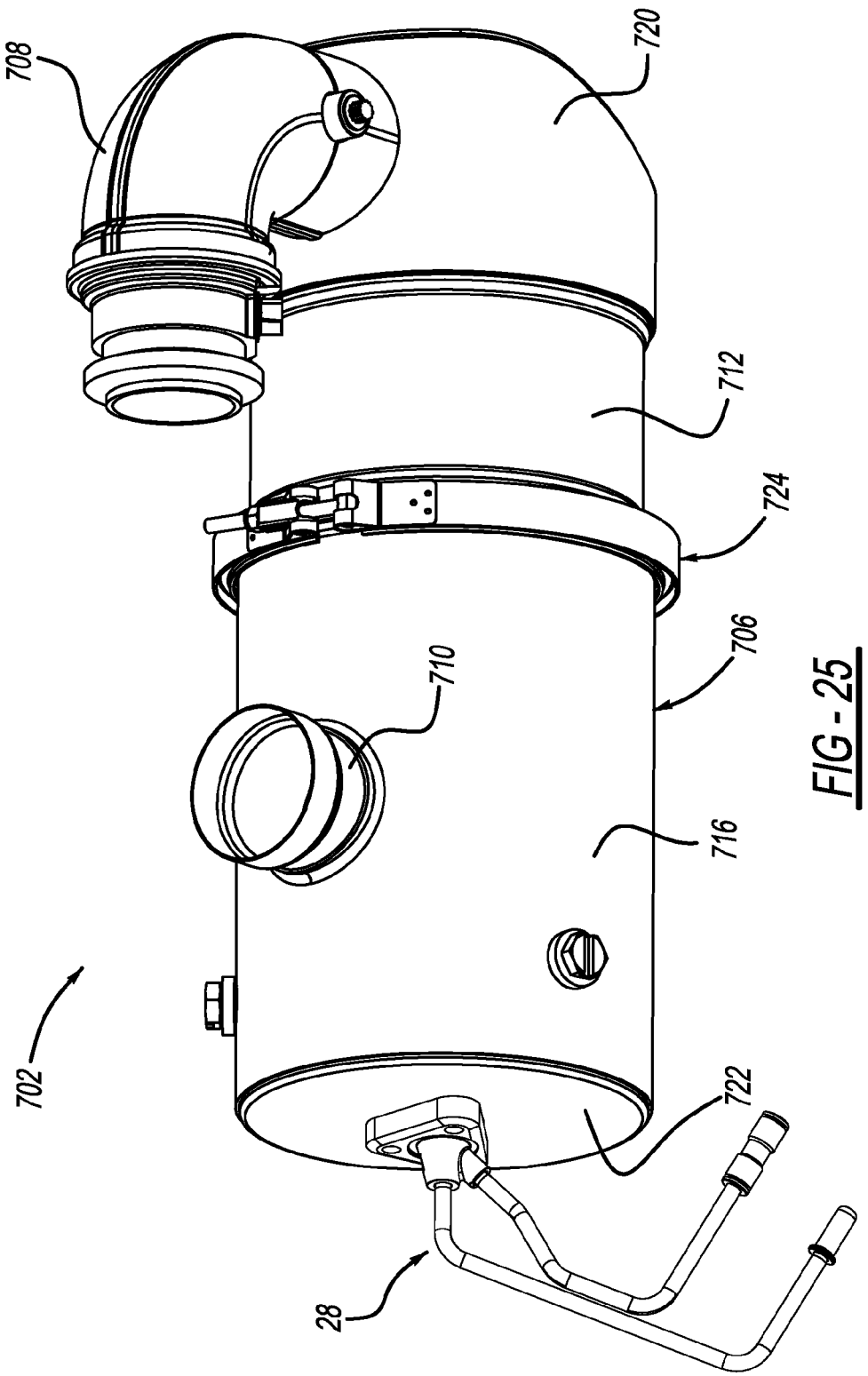
FIG. 25 is a perspective view of an exhaust treatment component that forms part of the exhaust after-treatment system illustrated in FIG. 24.
Figure 26:
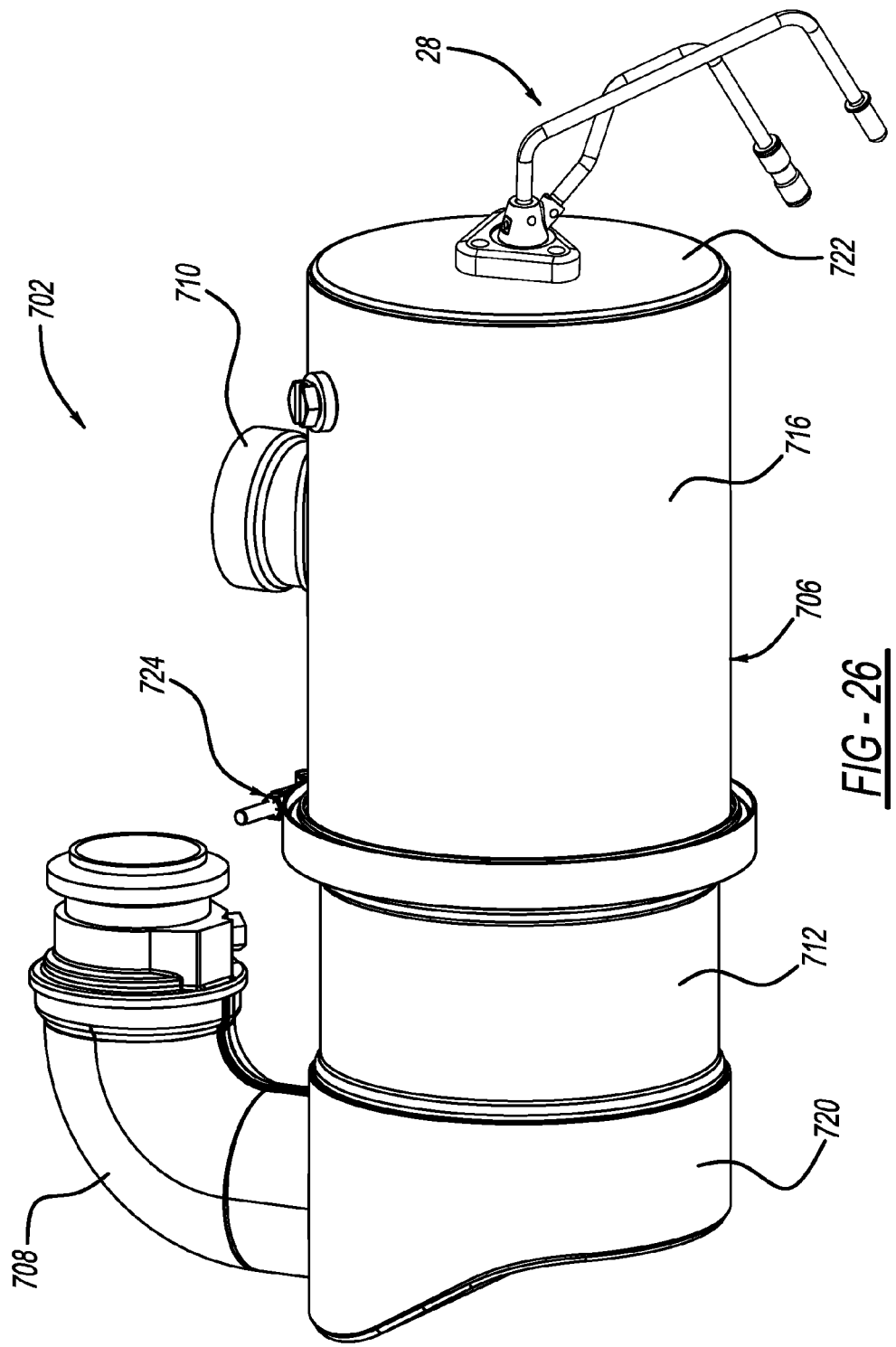
FIG. 26 is another perspective view of the exhaust treatment component illustrated in FIG. 25.
Figure 27:
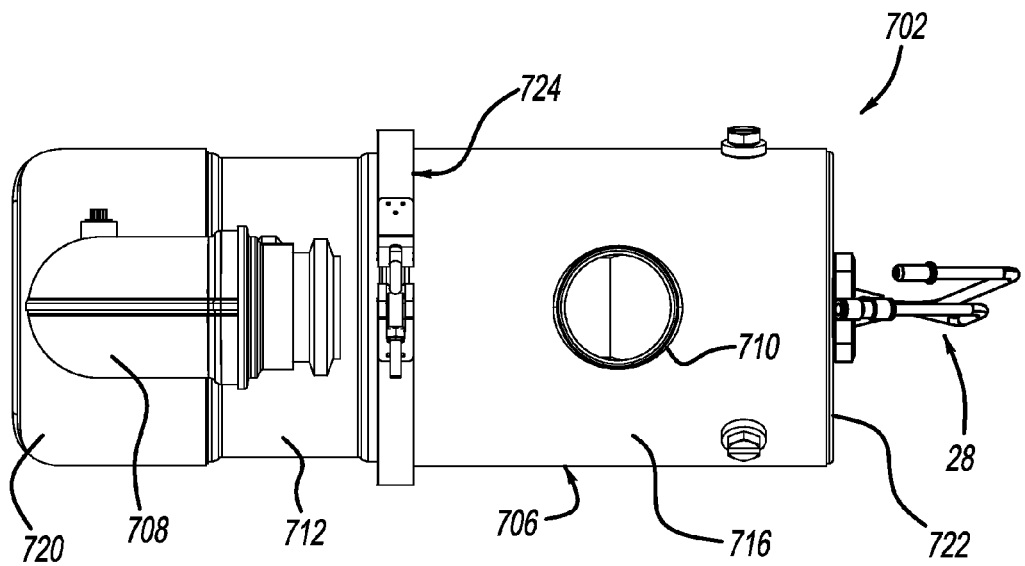
FIG. 27 is a top-perspective view of the exhaust treatment component illustrated in FIG. 25.
Figure 28:
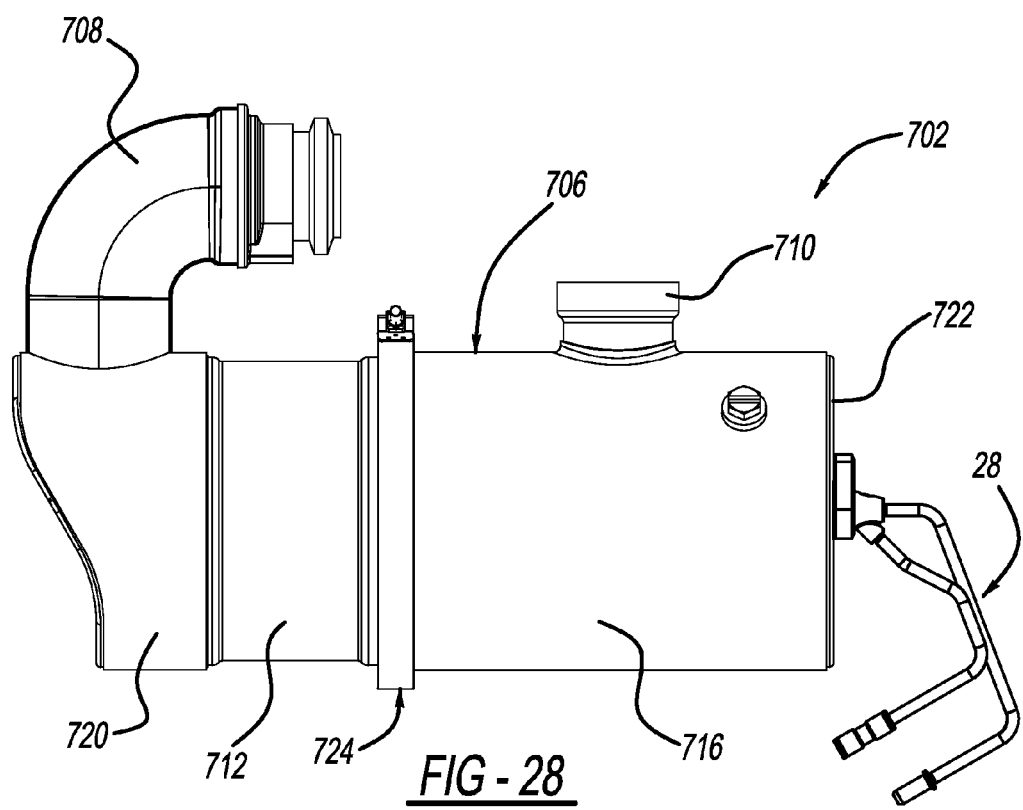
FIG. 28 is a side-perspective view of the exhaust treatment component illustrated in FIG. 25.

Now referring to FIGS. 24-30, an exemplary exhaust treatment assembly 700 including exhaust treatment components 702 and 704 is illustrated. As best shown in FIG. 24, exhaust treatment components 702 and 704 are arranged parallel to one another. It should be understood, however, that exhaust treatment components 702 and 704 can be arranged substantially co-axially, without departing from the scope of the present disclosure.

Exhaust treatment component 702 may include a housing 706, an inlet 708, and an outlet 710. Inlet 708 may be in communication with exhaust passage 14, and outlet 710 may be in communication with exhaust treatment component 704. Although outlet 710 is illustrated as being directly connected to exhaust treatment component 704, it should be understood that an additional conduit (not shown) may be positioned between outlet 710 and exhaust treatment component 704. The additional conduit can be non-linear such that the flow of exhaust through the conduit must turn before entering exhaust treatment component 704.

Figure 29:
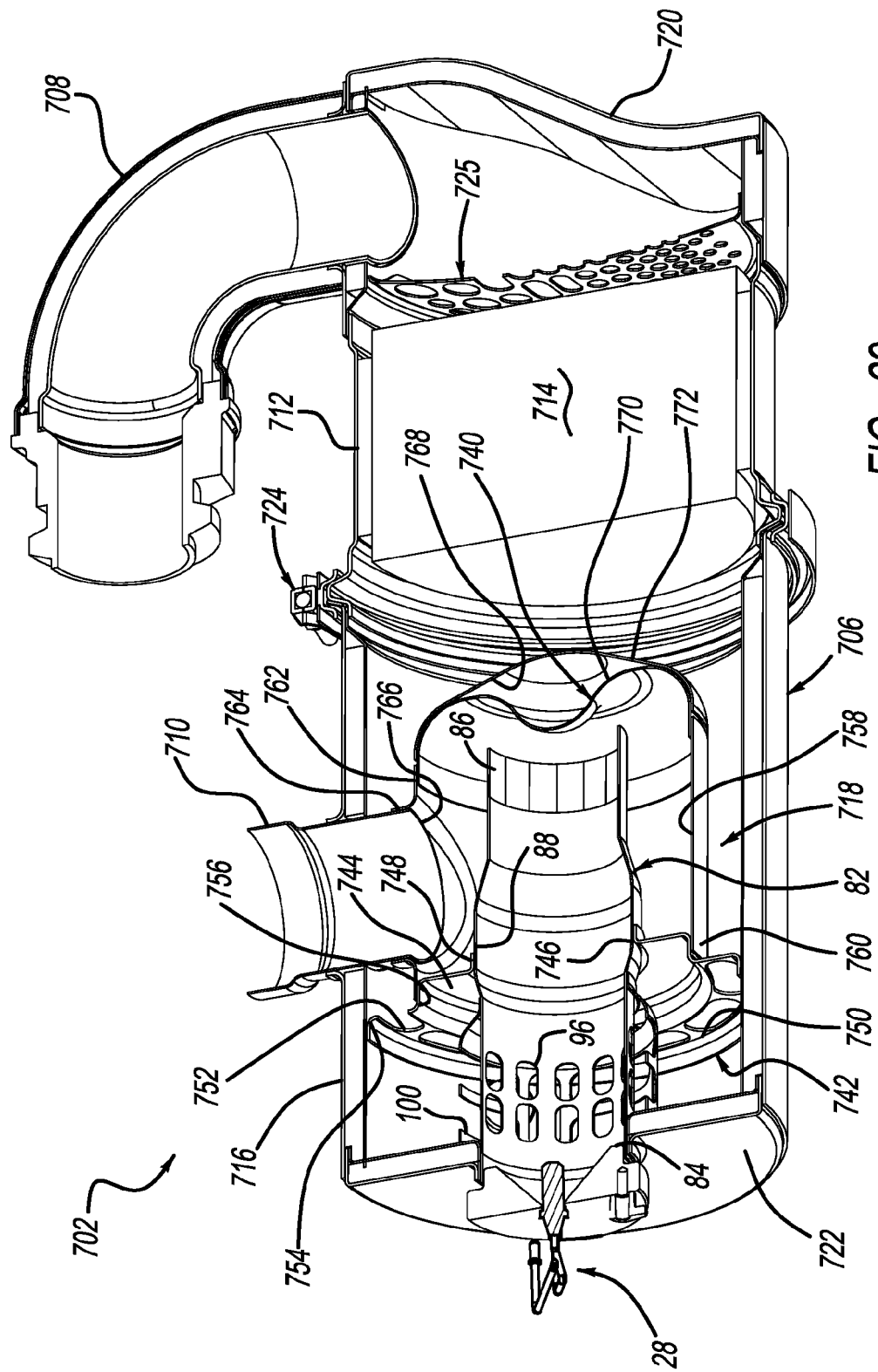
FIG. 29 is a cross-sectional perspective view of the exhaust treatment component illustrated in FIG. 25.
Figure 30:
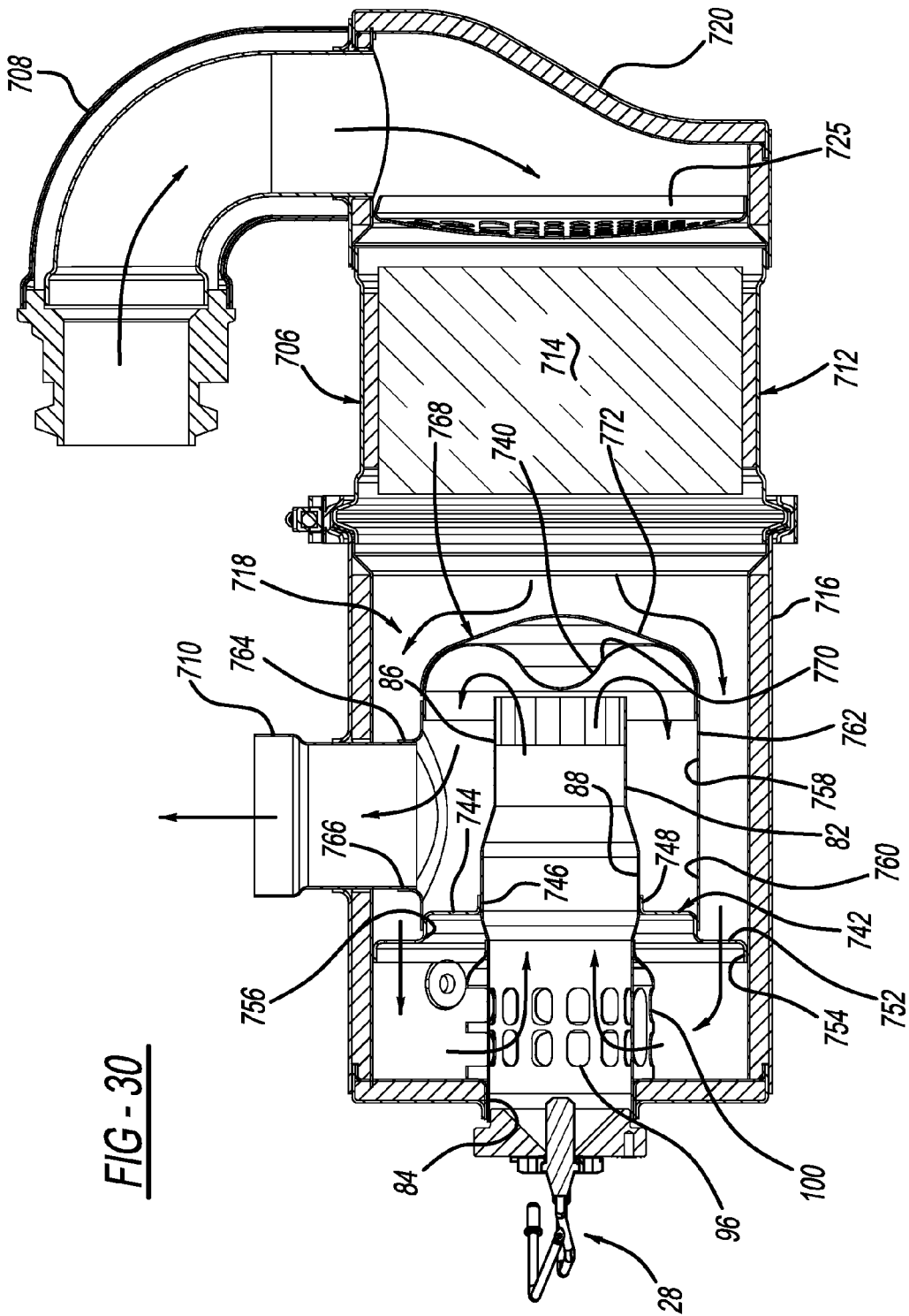
FIG. 30 is a cross-sectional view of the exhaust treatment component illustrated in FIG. 25.

Housing 706 can be cylindrically-shaped and may include a first section 712 supporting a DOC 714, and a second section 716 supporting a mixing assembly 718 (FIGS. 29 and 30). DOC 714 may be replaced by for example, a DPF or catalyst-coated DPF without departing from the scope of the present disclosure. Opposing ends of housing 706 can include end caps 720 and 722 to hermetically seal housing 706. End caps 720 and 722 can be slip-fit and welded to first and second sections 712 and 716, respectively. First and second sections 712 and 716 may be secured by a clamp 724. Alternatively, first and second sections 712 and 716 may be slip fit or welded, without departing from the scope of the present disclosure. The use of clamp 724 allows for easy removal of DOC 714 or mixing assembly 718 for maintenance, cleaning, or replacement of these components. A perforated baffle 725 may be positioned immediately downstream from inlet 708 and upstream for DOC 714. Exhaust from exhaust passage 14 will enter inlet 708, pass through perforated baffle 725, DOC 714, and mixing assembly 718, and exit outlet 710 before entering exhaust treatment component 704.

Exhaust treatment component 704 is substantially similar to exhaust treatment component 702. In this regard, exhaust treatment component 704 may include a housing 726, an inlet 728, and an outlet 730. Inlet 728 communicates with outlet 710 of exhaust treatment component 702, and outlet 730 may be in communication with a downstream section of exhaust passage 14.

Housing 726 can be cylindrically-shaped and may support an SCR 732 and ammonia slip catalyst 734. SCR 732 is preferably located upstream of ammonia slip catalyst 734. Opposing ends of housing 726 can include end caps 736 and 738 to hermetically seal housing 726. End caps 736 and 738 can be slip-fit and welded to housing 726. Alternatively, end caps 736 and 738 can be secured to housing 726 by clamps (not shown). Exhaust from outlet 710 of exhaust treatment component 702 will enter inlet 728, pass through SCR 732 and ammonia slip catalyst 734, and exit outlet 730 before entering the downstream section of exhaust passage 14.

Dosing module 28 may be positioned on end cap 722 at a location proximate outlet 710. As in previously described embodiments, dosing module 28 is operable to inject a reductant such as a urea exhaust treatment fluid into the exhaust stream before the exhaust stream passes through SCR 732. A sufficient intermingling of the exhaust and exhaust treatment fluid should occur to optimize the removal of $NO_x$ from the exhaust stream before the mixture passes through SCR 732. To assist in intermingling of the exhaust stream and the urea exhaust treatment fluid, mixing assembly 718 may be positioned downstream from DOC 714 and upstream of SCR 732. Mixing assembly 718 is positioned proximate dosing module 28 such that dosing module 28 may dose the urea exhaust treatment fluid directly into mixing assembly 718 where it may intermingle with the exhaust stream.

FIGS. 29 and 30 best illustrate mixing assembly 718. Similar to previously described embodiments, mixing assembly 718 includes a decomposition tube 82 including first end portion 84 that may be secured to end cap 722 and second end portion 86 that is positioned proximate DOC 714. Decomposition tube 82 may be substantially cylindrical, with radially expanded portion 88 positioned between the first and second end portions 84 and 86. A flow reversing device 740 at second end portion 86. In addition to decomposition tube 82 being fixed to end cap 722, mixing assembly 718 may be supported within housing 706 by a perforated support plate 742.

Support plate 742 includes an annular central portion 744 surrounding an aperture 746 defined by an axially extending flange 748 that is fixed to decomposition tube 82. An annular outer portion 750 of support plate 742 includes a plurality of through-holes 752 for allowing the exhaust to flow therethrough. Outer portion 750 also includes an axially-extending flange 754 for fixing support plate 742 to housing 706. An axially-extending shoulder portion 756 may be positioned between the annular central portion 744 and annular outer portion 750. Shoulder portion 756 provides a mounting surface for a cylindrical shell 758 of mixing assembly 718. Shell 758 includes a proximal end 760 fixed to shoulder portion 756 and a distal end 762 fixed to flow reversing device 740. A radially extending mounting flange 764 receives an end 766 of outlet 710.

As best shown in FIG. 30, the exhaust flow will enter inlet 708, pass through perforated baffle 725, and enter DOC 714. After the exhaust exits DOC 714, the exhaust will approach mixing assembly 718. Although not required by the present disclosure, mixing assembly 718 may cup-shaped nose 768 fixed to an outer surface 770 of flow-reversing device 740. Cup-shaped nose 768 may include a conical, hemispherical, or ellipsoid outer surface 772 that, upon contact by the exhaust, directs the exhaust around mixing assembly 718. Cup-shaped nose 768 may also have a concave surface relative to the direction of the exhaust. In addition, cup-shaped nose 768 may have raised or recessed features (e.g., bumps or dimples, not shown) formed on outer surface 772. Although cup-shaped nose 768 is illustrated as being fixed to flow-reversing device 740, it should be understood that cup-shaped nose 768 can be supported by a support plate (not shown) at a position proximate flow-reversing device 740. For example, a support plate similar to support plate 742 having through-holes 752 to allow for exhaust flow may be used, with annular central portion 744 defining cup-shaped nose 768 rather than aperture 746.

After passing around mixing assembly 718, the exhaust will pass through through-holes 752 of support plate 742. After passing through support plate 742, the exhaust may enter mixing assembly 718 through perforations 96 and 100. To assist in feeding the exhaust gas into mixing assembly 718, end cap 722 may define curved surfaces (i.e., similar to flow-reversing device 740, not shown) that direct the exhaust into mixing assembly 718. After entering decomposition tube 82, the exhaust flow will be exposed to the exhaust treatment fluid (e.g., urea) dosed into mixing assembly 718 by dosing module 28. As the exhaust flows through decomposition tube 82, the exhaust will be directed in a reverse direction by flow reversing device 740 into shell 758. The exhaust may then exit shell 758 through outlet 710 and enter exhaust treatment component 704 where SCR 732 and ammonia slip catalyst 734 are located.

According the above-described configuration, the exhaust flow will be forced to reverse direction within exhaust treatment component 702 twice. That is, the exhaust flow will firstly reverse direction as it enters mixing assembly 718, and the exhaust will secondly reverse direction due to contact with flow-reversing device 740. Due to the exhaust flow reversing in direction twice as it travels through exhaust treatment component 702, the exhaust flow will become tortuous, which increases the ability to intermingle the exhaust treatment fluid with the exhaust before the exhaust enters SCR 732. Due to the increased intermingling of the exhaust treatment fluid and the exhaust, the efficacy of SCR 732 in removing $NO_x$ from the exhaust can be increased.

Although not illustrated in FIGS. 29 and 30, it should be understood that flow-reversing device 740 may include deflecting members such as vanes 114. Alternatively, any of mixing assemblies 200, 300, 400, and 500 may be used in exhaust treatment component 702 without departing from the scope of the present disclosure.

Figure 31:
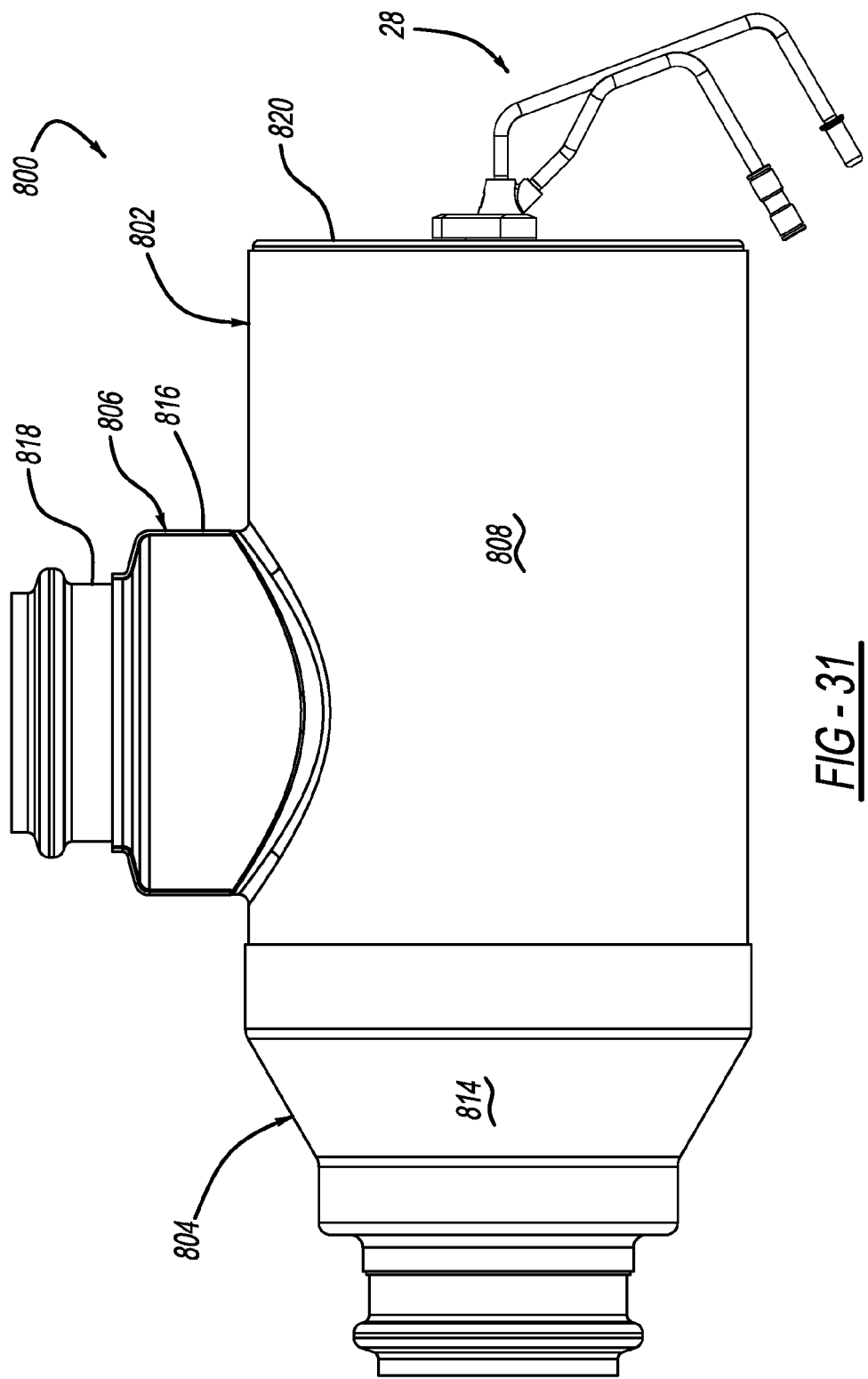
FIG. 31 is a side-perspective view of an exhaust treatment component according to a principle of the present disclosure.
Figure 32:
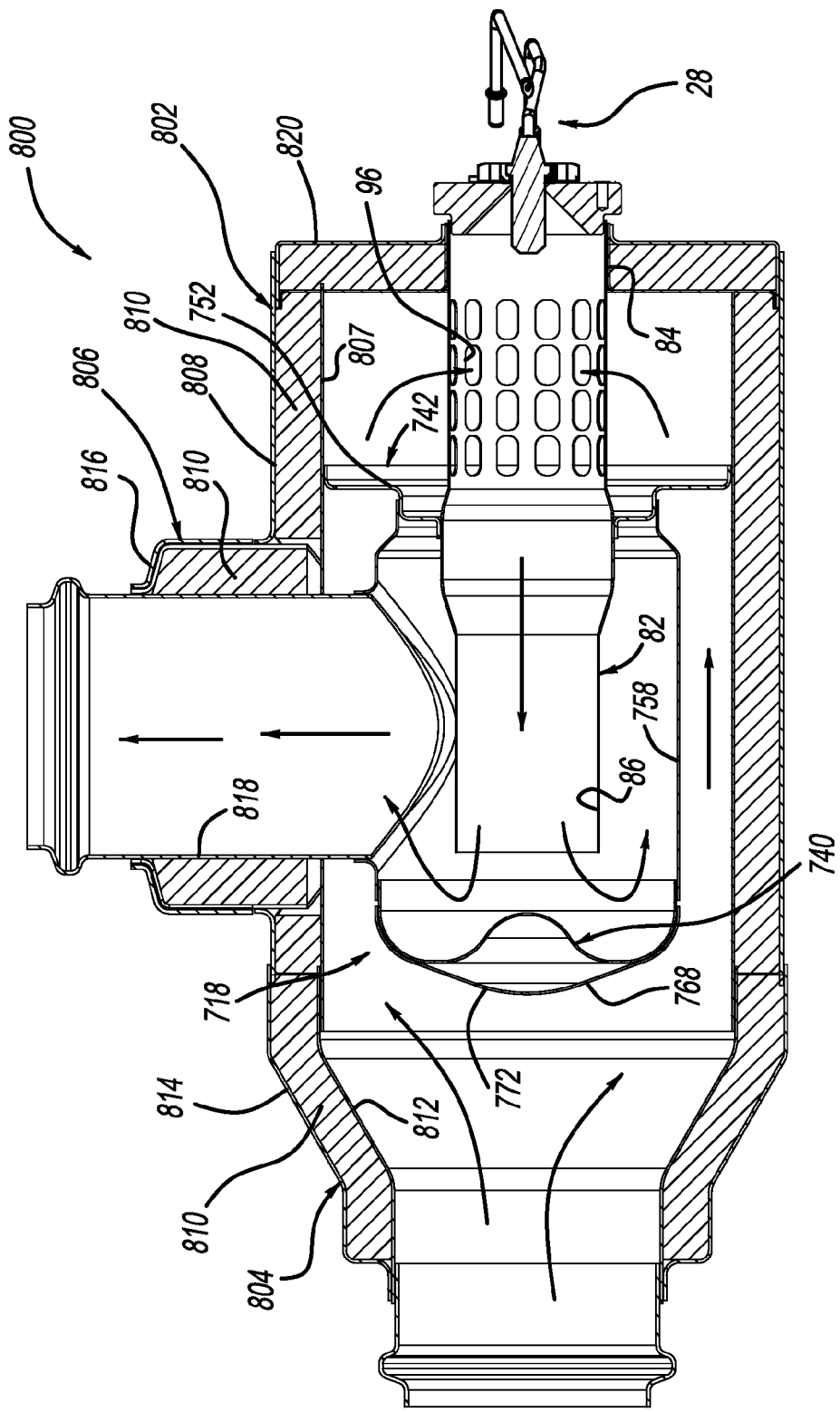
FIG. 32 is a cross-sectional view of the exhaust treatment component illustrated in FIG. 31.

Now referring to FIGS. 31 and 32, an exhaust treatment component 800 is illustrated. Exhaust treatment component 800 includes a housing 802, an inlet 804, and an outlet 806. Housing 802 may include an inner shell 807 and an outer shell 808. An insulating material 810 may be disposed between inner shell 806 and outer shell 808. Inlet 804 may be coupled to exhaust passage 14, and includes an inner cone 812 and an outer cone 814. Insulating material 810 may be disposed between inner cone 812 and outer cone 814. Inner cone 812 may be fixed to inner shell 807, and outer cone 814 may be fixed to outer shell 808. Inner cone 812 may first be fixed to outer cone 814, and then inlet 804 may be fixed to inner and outer shells 807 and 808. Outlet 806 may include an outer sleeve 816 fixed to outer shell 808, and an inner sleeve 818. Inner sleeve 818 may be constructed of one or more sections that are hermetically sealed. Insulating material 810 may be disposed between inner sleeve 818 and outer sleeve 816. Outlet 806 may extend radially outward from housing 802, while inlet 804 may be co-axial with housing 802.

An end cap 820 may be coupled to housing 802 at an end of housing 802 opposite to inlet 804. Dosing module 28 may be positioned on end cap 820 (or on an additional flange (not shown) at a location proximate outlet 806. As in previously described embodiments, dosing module 28 is operable to inject a reductant such as a urea exhaust treatment fluid into the exhaust stream before the exhaust stream passes through an SCR (not shown). A sufficient intermingling of the exhaust and exhaust treatment fluid should occur to optimize the removal of $NO_x$ from the exhaust stream before the mixture passes through the SCR. To assist in intermingling of the exhaust stream and the urea exhaust treatment fluid, mixing assembly 718 may be positioned between inlet 804 and outlet 806. Mixing assembly 718 is positioned proximate dosing module 28 such that dosing module 28 may dose the exhaust treatment fluid directly into mixing assembly 718 where it may intermingle with the exhaust stream.

FIG. 32 best illustrates mixing assembly 718 within exhaust treatment component 800. Mixing assembly 718 includes a decomposition tube 82 including first end portion 84 that may be secured to end cap 820 and second end portion 86 that is positioned proximate inlet 804. The exhaust flow will enter inlet 804 and approach mixing assembly 718. Although not required by the present disclosure, mixing assembly 718 may include cup-shaped nose 768 fixed to an outer surface 770 of flow-reversing device 740. Cup-shaped nose 768 may include a conical, hemispherical, or ellipsoid outer surface 772 that, upon contact by the exhaust, directs the exhaust around mixing assembly 718. Cup-shaped nose 768 may also have a concave surface relative to the direction of the exhaust. In addition, cup-shaped nose 768 may have raised or recessed features (e.g., bumps or dimples, not shown) formed on outer surface 772. After passing around mixing assembly 718, the exhaust will pass through through-holes 752 of support plate 742. After passing through support plate 742, the exhaust may enter mixing assembly 718 through perforations 96. Although mixing assembly 718 is illustrated in FIG. 32 as not including perforated collar 98, it should be understood that the illustrated embodiment may include perforated collar 98 without departing from the scope of the present disclosure.

After entering decomposition tube 82, the exhaust flow will be exposed to the exhaust treatment fluid (e.g., urea) dosed into mixing assembly 718 by dosing module 28. As the exhaust flows through decomposition tube 82, the exhaust will be directed in a reverse direction by flow reversing device 740 into shell 758. The exhaust may then exit shell 758 through outlet 806 and enter another exhaust treatment component (e.g., exhaust treatment component illustrated in FIG. 24) where an SCR may be located.

Although not illustrated in FIG. 32, it should be understood that flow-reversing device 740 may include deflecting members such as vanes 114. Alternatively, any of mixing assemblies 200, 300, 400, and 500 may be used in exhaust treatment component 800 without departing from the scope of the present disclosure.

According the above-described configuration, the exhaust flow will be forced to reverse direction within exhaust treatment component 800 twice. That is, the exhaust flow will firstly reverse direction as it enters mixing assembly 718, and the exhaust will secondly reverse direction due to contact with flow-reversing device 740. Due to the exhaust flow reversing in direction twice as it travels through exhaust treatment component 800, the exhaust flow will become tortuous, which increases the ability to intermingle the exhaust treatment fluid with the exhaust before the exhaust enters an SCR. Due to the increased intermingling of the exhaust treatment fluid and the exhaust, the efficacy of the SCR in removing $NO_x$ from the exhaust can be increased.

Moreover, it should be understood that exhaust treatment component 800 does not include a DOC, DPF, SCR, or some other type of exhaust treatment substrate. Without any of these devices, component 800 may be made to be compact. Such a design allows for existing exhaust after-treatment systems including an SCR to be retro-fit with component 800 to assist in increasing intermingling of the exhaust and urea exhaust treatment fluid.

It should be understood that each of the above-described configurations may be modified, as desired. For example, although inlet 708 illustrated in FIG. 24 is illustrated as having a 90 degree bend, the present disclosure contemplates a co-axial inlet like that illustrated in FIG. 31 (i.e., inlet 804) or a radially-positioned inlet like inlet 728. Similarly, outlet 710 may be replaced by a co-axial outlet (similar to co-axial inlet 804) or an outlet having a 90 degree bend (similar to inlet 708). Similar modifications may be made in component 800, without departing from the scope of the present disclosure.

Figure 33:
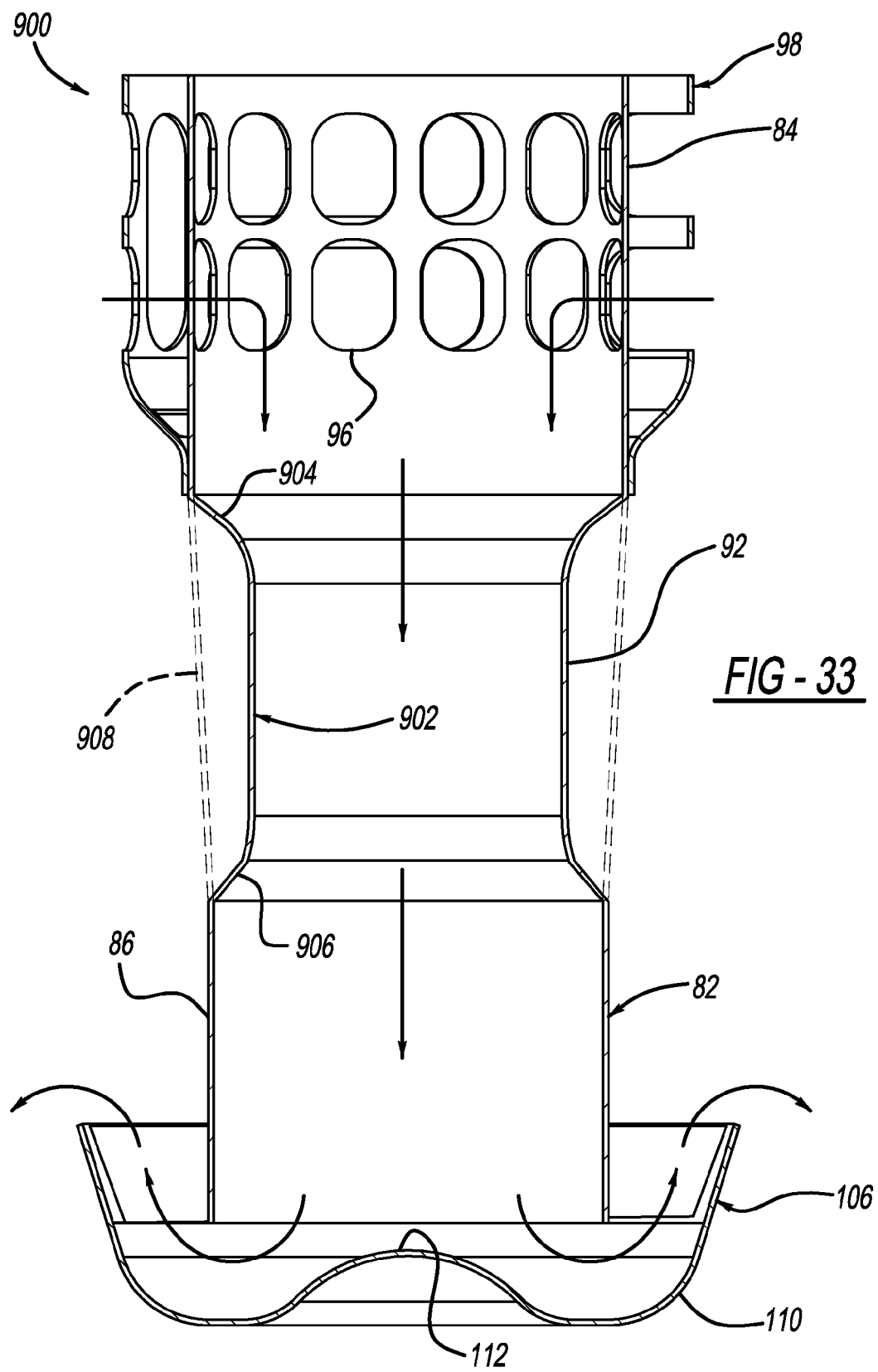
FIG. 33 is a cross-sectional view of a mixing assembly according to a principle of the present disclosure.

FIG. 33 illustrates another mixing assembly 900 according to the present disclosure. Similar to previously described embodiments, mixing assembly 90 includes a decomposition tube 82 including a first end portion 84 that may be secured to end cap 74 and a second end portion 86 that is positioned proximate SCR 70. Decomposition tube 82 may be substantially cylindrical, with a radially narrowed portion 902 positioned between the first and second end portions 84 and 86.

Radially narrowed portion 902 includes a conically-narrowing portion 904 that narrows decomposition tube 82, a cylindrical portion 92 downstream from the first conically-narrowing portion 904 having a diameter that is less than that of first and second end portions 84 and 86, and a conically-expanding portion 906 that radially expands decomposition tube 82. It should be understood that first and second end portions 84 and 86 may have different diameters, without departing from the scope of the present disclosure. It should also be understood that the present disclosure does not require conically-expanding portion 906. That is, radially narrowed portion 902 may extend over the entire length of second end portion 86. Radially narrowing decomposition tube 82 results in an increase in the velocity of the exhaust gas as it travels through decomposition tube 82. The increase in velocity assists in atomization of the reagent exhaust treatment fluid.

Although mixing assemblies such as mixing assembly 80 (see e.g., FIG. 9) and mixing assembly 900 (see e.g., FIG. 33) have been described as including either a radially expanded portion 88 or a radially narrowed portion 902, the present disclosure should not be limited thereto. In this regard, it should be understood that the present disclosure contemplates a mixing assembly including an entirely cylindrical decomposition tube 82 where decomposition tube 82 has the same diameter along the entire length thereof. An entirely cylindrical decomposition tube 82 is illustrated, for example, in FIG. 33 at 908.

Now referring to FIGS. 34-37, another exhaust treatment system 1000 will be described. Exhaust treatment system 1000 includes exhaust treatment components 18 and 20, where exhaust treatment component 18 may include a DOC 52 and/or a DPF 56 positioned within a housing 44 and exhaust treatment component 20 may include an SCR 70 and/or an ammonia slip catalyst 72 within a housing 64. A common hood 1002 fluidly and mechanically connects exhaust treatment components 18 and 20.

Hood 1002 includes a peripheral outer surface 1004 defining a connection flange 1006 for connecting to each housing 44 and 64. Connection flange 1006 may be welded to each housing 44 and 64, or connection flange 1006 may be secured to each housing 44 and 64 using a clamp 1005. To prevent exhaust gases from escaping hood 1002 as the exhaust gases travel from exhaust treatment component 18 to exhaust treatment component 20, a solid connection plate 1008 may be positioned between exhaust treatment component 18 and exhaust treatment component 20. Connection plate 1008 may include apertures 1010 for receipt of housings 44 and 64. To ensure a gas-tight fit between connection plate 1008 and housings 44 and 64, connection plate 1008 may be welded to each housing 44 and 64, or a gasket (not shown) may be positioned between housings 44 and 64 and apertures 1010. An end plate 1012 of hood 1002 is integral with peripheral outer surface 1004. End plate 1012 may include a contoured surface 1014 at exhaust treatment component 18 that assists in directing the exhaust gases toward exhaust treatment component 20. In addition, hood 1002 may include a mounting device 1016 for receipt of a dosing module 28 operable to dose reagent exhaust treatment fluid into the exhaust gases.

To assemble exhaust treatment system 1000, connection plate 1008 may be secured to each exhaust treatment component 18 and 20 by welding, or with a gasket (not shown) that allows connection plate 1008 and exhaust treatment components 18 and 20 to be secured by an interference fit therebetween. After connection plate 1008 is secured to exhaust treatment components 18 and 20, hood 1002 may then be secured to exhaust treatment components 18 and 20 and connection plate 1008 by welding or by a clamp (not shown).

Figure 34:
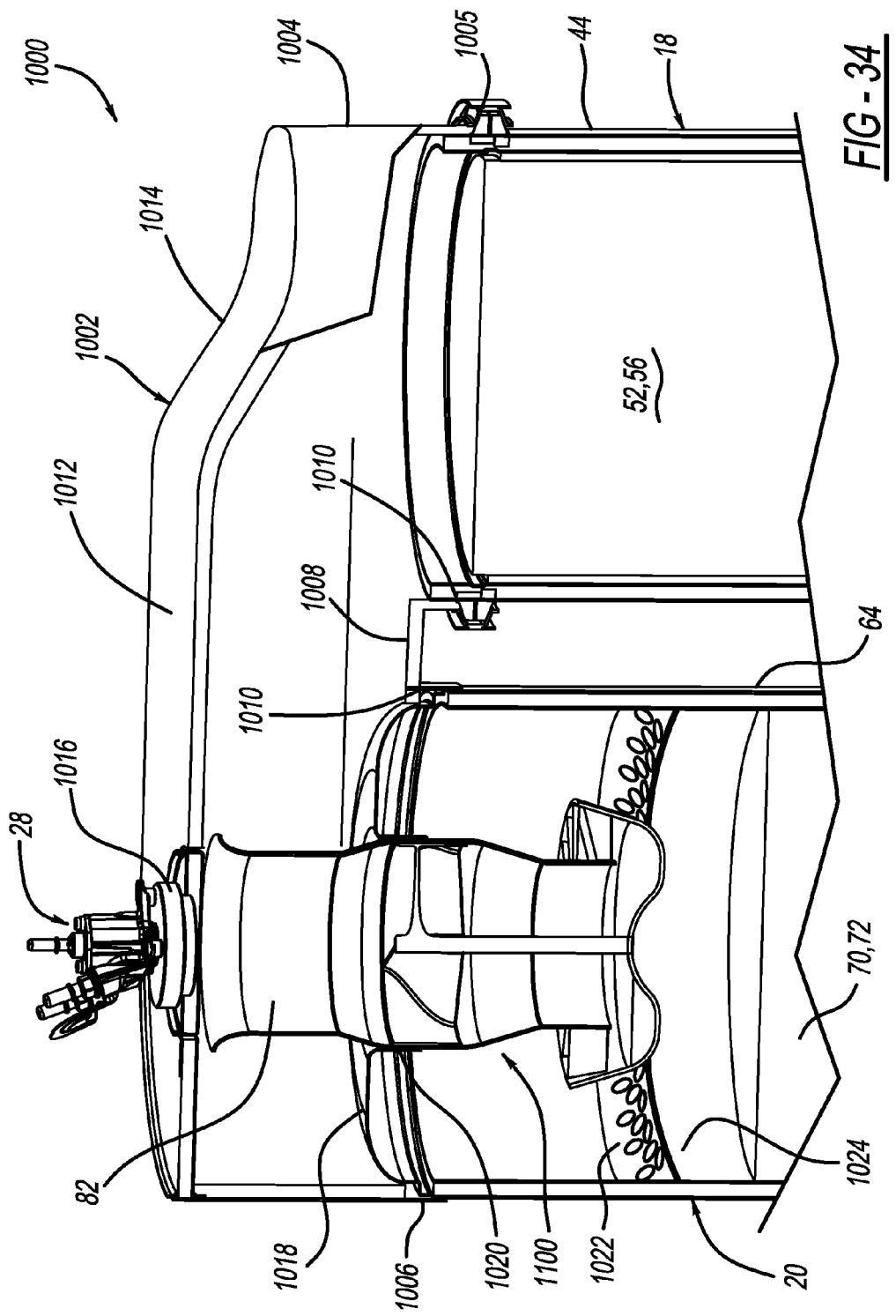
FIG. 34 is a perspective partial cross-sectional view of an exhaust treatment system according to a principle of the present disclosure.

Exhaust treatment system 1000 includes a mixing assembly 1100 positioned upstream from SCR 70 that assists in intermixing the exhaust gases and reagent exhaust treatment fluid. As illustrated in FIG. 34, mixing assembly 1100 extends between hood 1002 and exhaust treatment component 20. To secure mixing assembly 1100 between hood 1002 and exhaust treatment component 20, a solid partition plate 1018 that axially aligns mixing assembly 1100 with SCR 70 may be used. Partition plate 1018 includes a central axially extending flange 1020 that is coupled to decomposition tube 82 of mixing assembly 1100 by welding or any other attachment method known to one skilled in the art. Partition plate 1018 may be secured to housing 64 or may be secured to connection plate 1008. After the exhaust exits mixing assembly 1100, the exhaust gas may pass through a perforated baffle ring 1022 positioned upstream from SCR 70 that further assists in intermingling the exhaust gases and reagent exhaust treatment fluid. Baffle ring 1022 may be secured to an interior surface 1024 of housing 64. Alternatively, baffle ring 1022 can be secured in a separate housing that is coupled to an end of housing 64.

Figure 35:
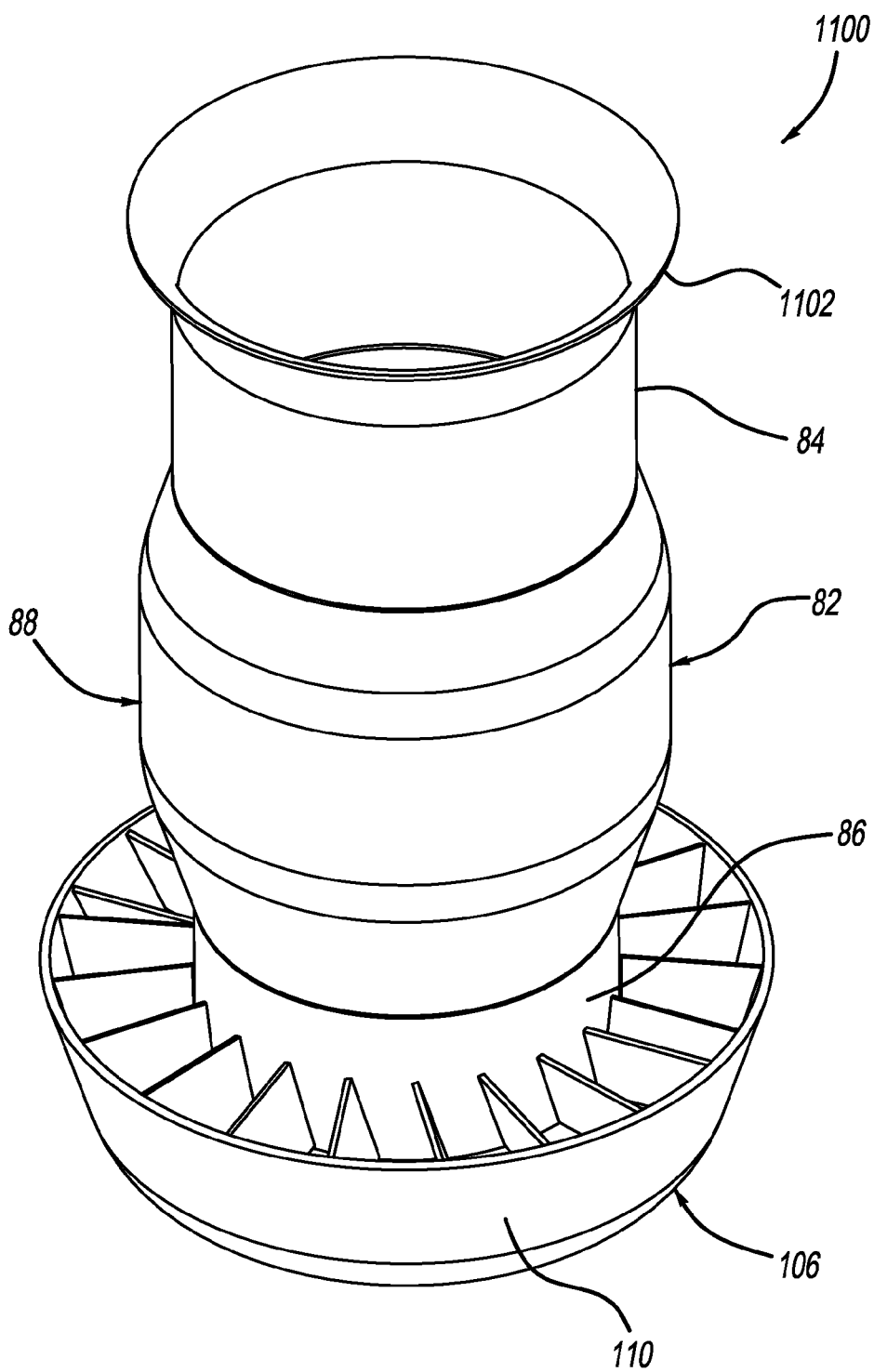
FIG. 35 is a perspective view of a mixing assembly according to a principle of the present disclosure.
Figure 36:
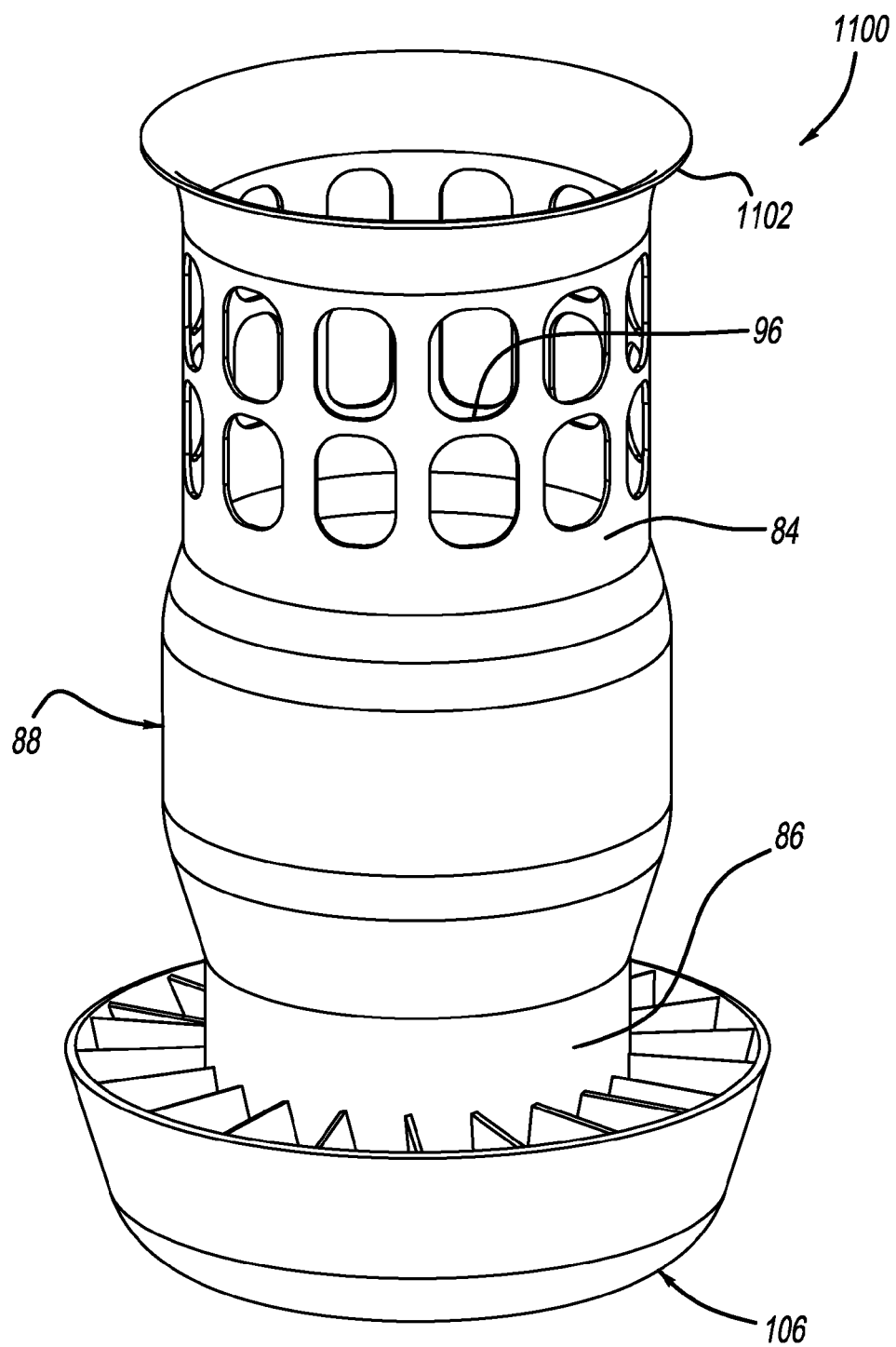
FIG. 36 is a perspective view of a mixing assembly according to a principle of the present disclosure.

As illustrated in FIGS. 35 and 36, mixing assembly 1100 includes decomposition tube 82 with radially expanded portion 88. It should be understood, however, that decomposition tube 82 can be entirely cylindrical or include a radially narrowed portion like mixing assembly 900 illustrated in FIG. 33. Regardless, mixing assembly 1100 is not fixed to end plate 1012 of hood 1002. Rather, mixing assembly 1100 is spaced apart from end plate 1012 of hood 1002.

In accordance with the present disclosure, first end portion 84 of decomposition tube 82 includes a flared edge 1102. Flared edge 1102 increases the diameter of first end 84 of decomposition tube 82, and is designed to increase the ease with which the exhaust gases may enter mixing assembly 1100. By increasing the ease with which the exhaust gases may enter mixing assembly 1100, backpressures within exhaust treatment system 1000 may also be reduced. It should be understood that although FIG. 35 illustrates first end 84 of decomposition tube 82 as being devoid of perforations 96, the present disclosure contemplates the use of perforations 96 in first end 84 as illustrated in FIG. 36.

As in previously described embodiments, perforations 96 can vary in size around the circumference of first end 84, and assist in creating turbulence and increasing velocity of the exhaust stream as it enters decomposition tube 82. Moreover, although not illustrated in FIGS. 35 and 36, it should be understood that mixing assemblies 1100 may also include a perforated collar 98 like that shown in FIG. 9 without departing from the scope of the present disclosure. Similar to previously described embodiments, mixing assemblies 1100 include a flow reversing device 106 at second end 86. Any of the flow reversing devices 106 such as those illustrated in FIGS. 7, 11, 15, 19, and 21 may be used.

Figure 37:
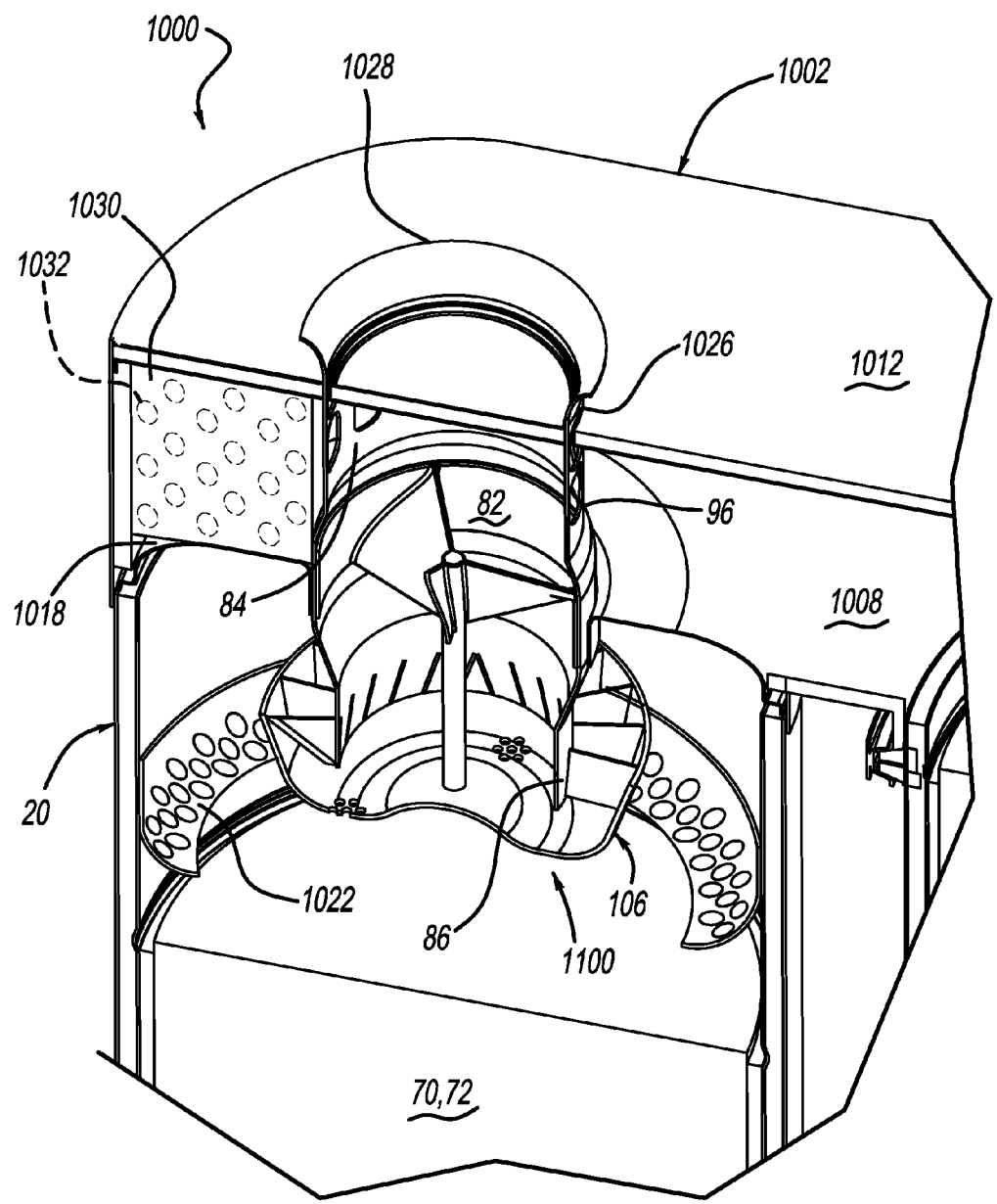
FIG. 37 is a perspective cross-sectional view of a mixing assembly according to a principle of the present disclosure.

Although exhaust treatment system 1000 has been described above as including a mixing assembly 1100 spaced apart from end plate 1012, it should be understood that the present disclosure should not be limited thereto. Specifically, as best shown in FIG. 37, it can be seen that hood 1002 can include an aperture 1026 for receipt of first end portion 84 of decomposition tube 82 such that decomposition tube 82 can be directly attached to end plate 1012 of hood 1002. To mount dosing module (not shown) relative to end plate 1012 and decomposition tube 82, a mounting ring 1028 can be secured to first end portion 84 such that dosing module can dose the reagent exhaust treatment fluid directly into decomposition tube 82.

As illustrated in FIG. 37, a flow distribution plate 1030 can be positioned in hood 1002 relative to first end portion 84 of decomposition tube 82. Flow distribution plate 1030 can be a solid plate, or flow distribution plate 1030 can include a plurality of perforations 1032 as show in phantom. Flow distribution plate 1030 can be secured to either hood 1002 or first end portion 84 of decomposition tube by welding, brazing, or the like. Regardless, flow distribution plate 1030 assists in preventing the exhaust flow from swirling about first end portion 84 of decomposition tube 82 before entering perforations 96 of decomposition tube 82. In other words, flow distribution plate 1030 blocks the flow of exhaust around first end portion 84 and assists in forcing the exhaust to enter decomposition tube 82.

Figure 38:
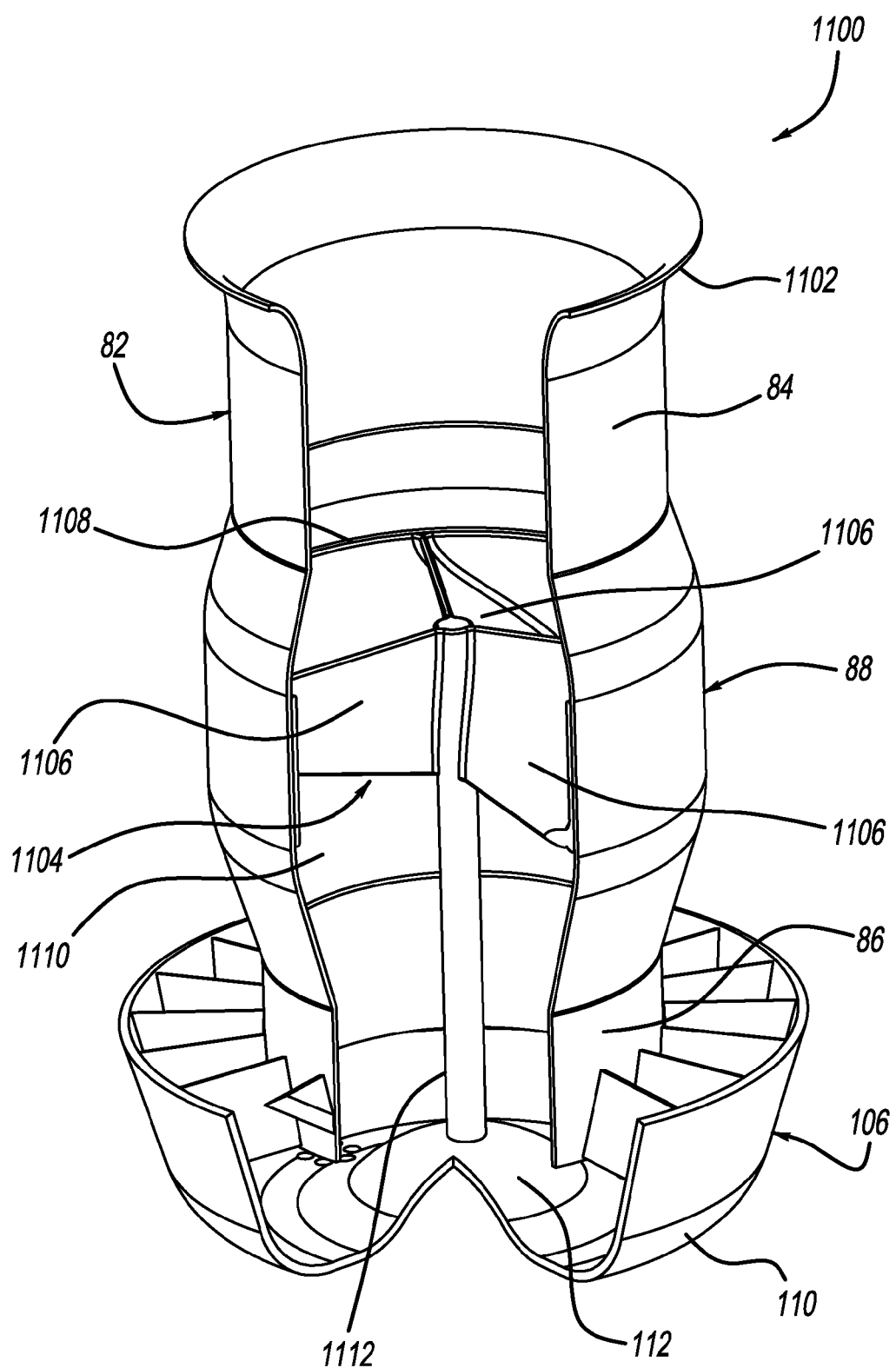
FIG. 38 is a perspective partial cross-sectional view of an exhaust treatment system according to a principle of the present disclosure.

Now referring to FIG. 38, it can be seen that mixing assembly 1100 may additionally include a static mixer 1104 positioned within decomposition tube 82 at a location upstream from flow reversing device 106. Static mixer 1104 may include a plurality of mixing blades 1106 secured within a mounting ring 1108 that is secured by an interference fit or welding to an interior surface 1110 of decomposition tube 82. Preferably, static mixer 1104 is positioned between first end 84 and second end 86 at radially expanded portion 88. Mixing blades 1106 may be slightly twisted to swirl the mixture of exhaust gas and reagent exhaust treatment fluid as the mixture passes through decomposition tube 82. It should be understood, however, that any type of static mixer can be used as is known in the art. Regardless, static mixer 1104 further assists in the intermingling of the exhaust gas and the reagent exhaust treatment fluid.

Static mixer 1104 can include a support rod 1112 that axially extends from mixing blades 1106 in a direction toward flow reversing device 106. Support rod 1112 provides an attachment point for flow reversing device 106 such that flow reversing device 106 may be secured to support rod 1112 by welding, brazing, or the like. The use of support rod 1112 to secure flow reversing device 106 relative to decomposition tube 82 removes the need for a separate support baffle (now shown) that secures flow reversing device 106 to an interior surface of housing 64. It should be understood, however, that static mixer 1104 is not required to include support rod 1112.

Now referring to FIGS. 39 and 40, yet another configuration of mixing assembly 1100 is illustrated. Similar to the mixing assemblies illustrated in FIGS. 35-37, mixing assembly 1100 illustrated in FIGS. 39 and 40 is designed to be spaced apart from end plate 1012 of hood 1002. Mixing assembly 1100 differs from those illustrated in FIGS. 35-37 in that first end portion 84 is truncated. In other words, a length L of first end portion 84 is variable in an axial direction along a circumference thereof. More specifically, a length of first end portion 84 along a circumference thereof decrease from flared edge 1102 in a direction toward second end portion 86 such that a length L1 at terminal end of first end portion 84 at flared edge 1102 is greater than a length L2 at a location closer to second end portion 86. The amount that the length of first end portion 84 decreases along a circumference thereof is variable, and can be tuned as necessary. The truncation of first end portion 84 allows the exhaust gases to more easily enter decomposition tube 82, assists in reducing backpressure in exhaust treatment system 1000, and increases the turbulence with which the exhaust gases enter the decomposition tube 82.

Although not required by the present disclosure, the use of a mixing assembly 1100 with a truncated first end portion 84 can be in combination with a cylindrical spray guide 1032 attached to end plate 1012. Spray guide 1032 ensures that the reagent exhaust treatment fluid fed into the exhaust by dosing module 28 will enter decomposition tube 92. This can be particularly important with the truncated first end portion 84, which has a larger opening in comparison to previously described embodiments and is spaced apart from end plate 1012. It should be understood, however, that cylindrical spray guide 1026 may be used in combination with any mixing assembly that is spaced apart from end plate 1012 to ensure proper entry of the reagent exhaust treatment fluid into decomposition tube 82.

Figure 41:
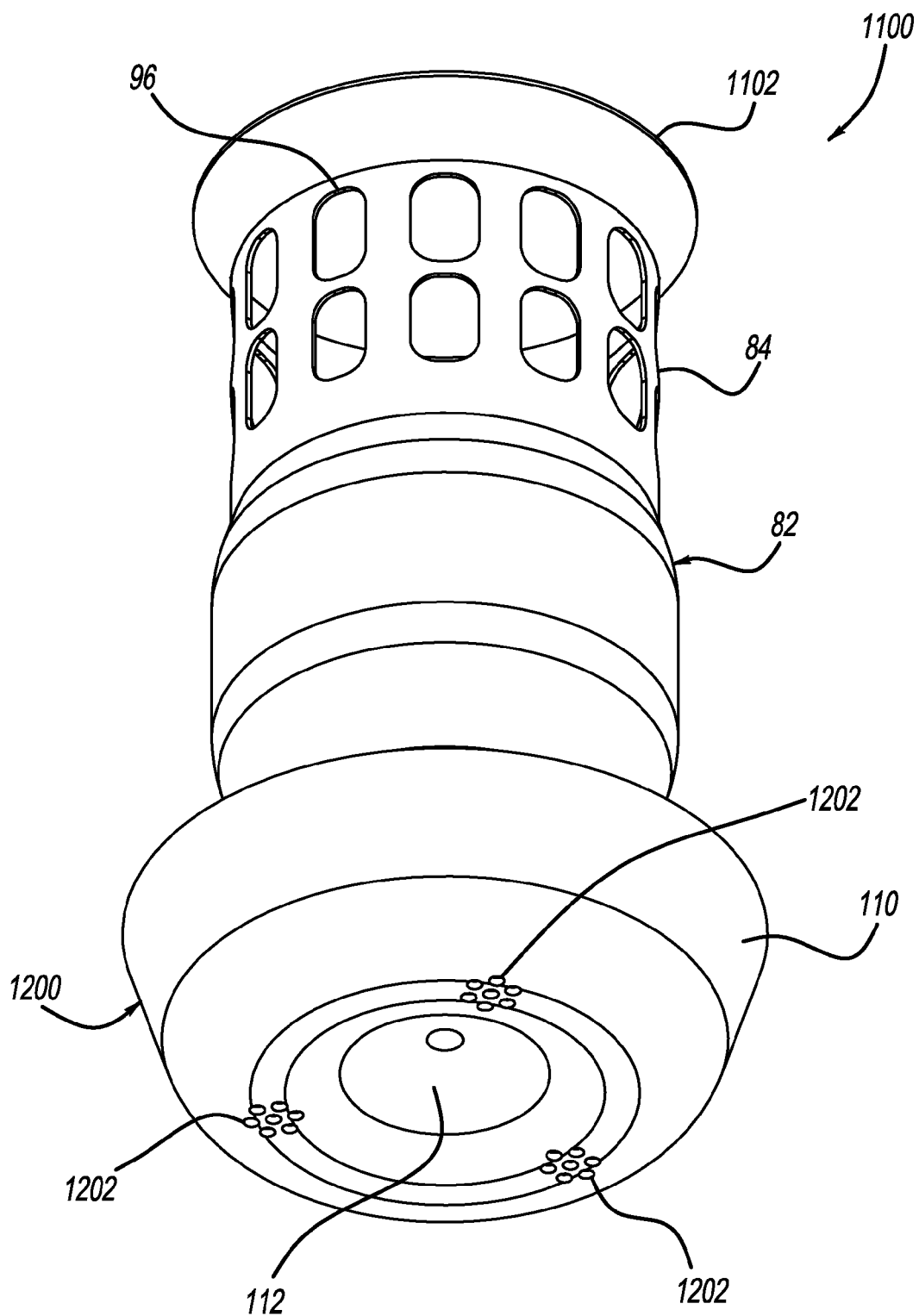
FIG. 41 is a perspective view of a mixing assembly according to a principle of the present disclosure.
Figure 42:
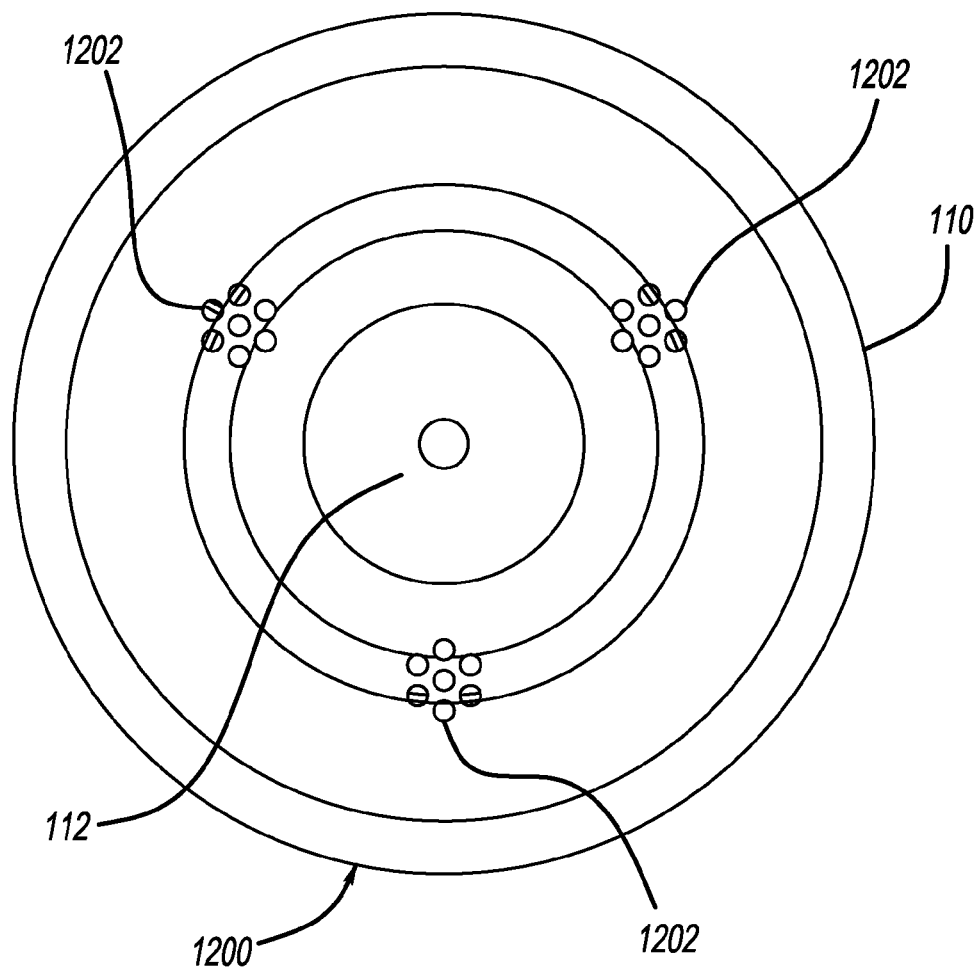
FIG. 42 is a bottom perspective view of the mixing assembly illustrated in FIG. 41.

Now referring to FIGS. 41 and 42, a flow reversing device 1200 will be described. Flow reversing device 1200 is similar to previously described flow reversing device 106 in that flow reversing device 1200 is a substantially cup-shaped member 110 having a central bulge 112 formed therein. Flow reversing device 1200 has a diameter greater than that of second end portion 86 of decomposition tube 82 such that as the exhaust flow enters the cup-shaped member 110, the exhaust flow will be forced to flow in a reverse direction. Reversing the flow direction assists in intermingling of the reagent exhaust treatment fluid and the exhaust stream before the exhaust stream reaches SCR 70. Flow reversing device 1200 may also be configured to include deflecting members like those illustrated in FIGS. 7, 11, 15, 19, and 21.

In accordance with the present disclosure, flow reversing device 1200 may include a plurality of through-holes 1202 formed in a bottom surface 1204 of cup-shaped member 110. Although through-holes 1202 allow a small portion of the exhaust stream to pass through cup-shaped member 110 without reversing direction, through-holes 1202 are designed to allow any reagent exhaust treatment fluid that has not atomized to flow therethrough. By allowing liquid reagent exhaust treatment fluid to pass through cup-shaped member 110, the prevention of urea deposits can be prevented from forming within cup-shaped member 110. In this regard, if liquid reagent exhaust treatment fluid collects within cup-shaped member 110 and subsequently evaporates, urea deposits may form within cup-shaped member 110 that may eventually obstruct exhaust flow from decomposition tube 82 and through flow reversing device 1200. Although flow reversing device 1200 is illustrated as having through-holes 1202, it should be understood that any type of perforation i.e. such as elongate slots is acceptable so long as any liquid reagent exhaust treatment fluid is allowed to pass therethrough.

Figure 43:
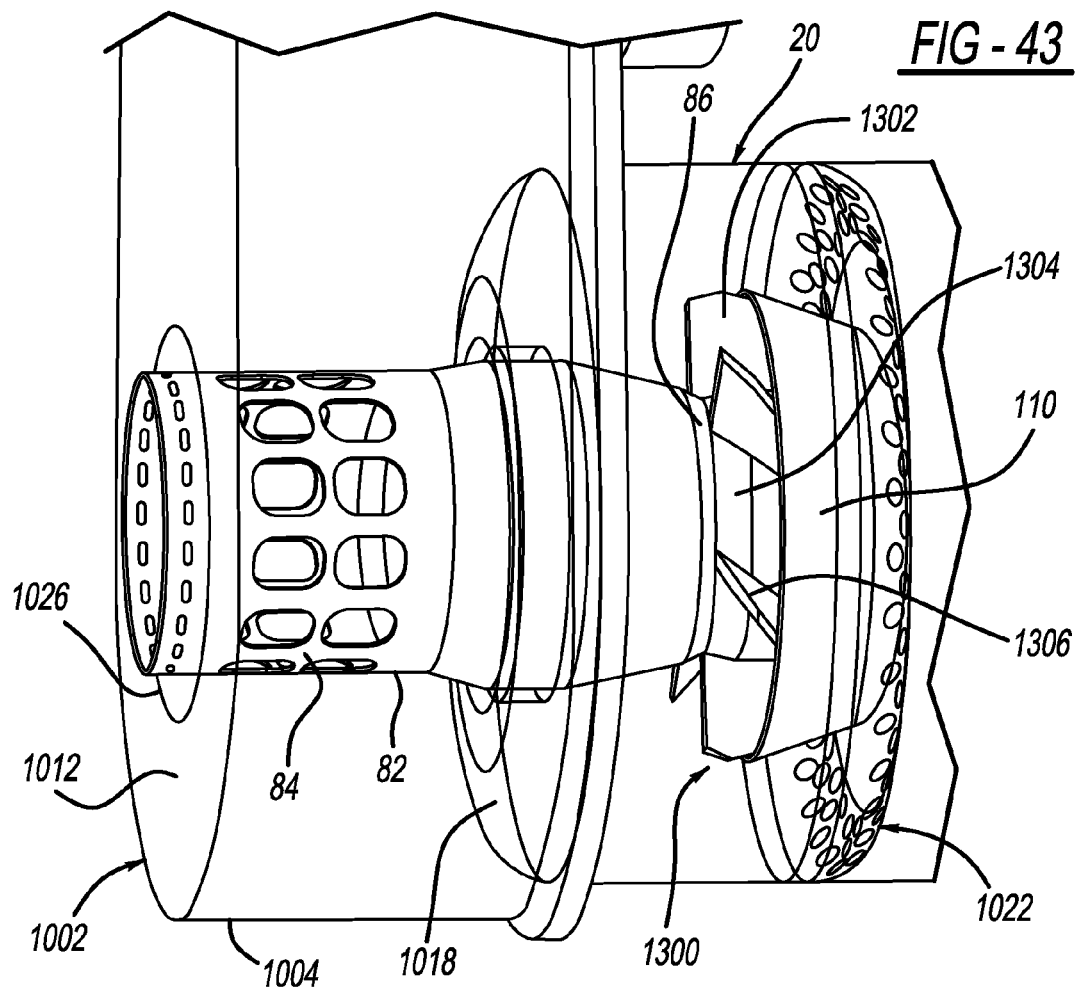
FIG. 43 is a perspective view of a mixing assembly according to a principle of the present disclosure.
Figure 44:
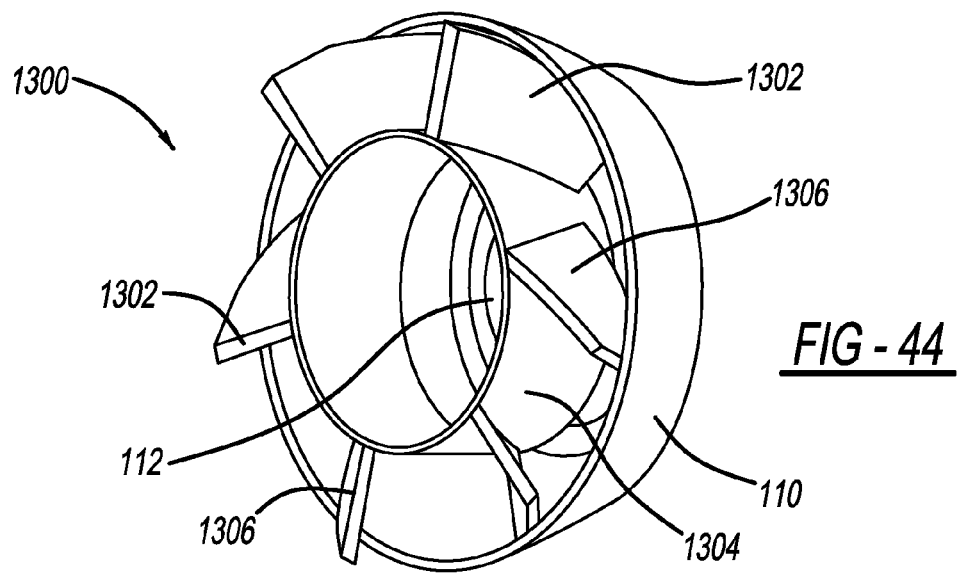
FIG. 44 is a perspective view of a flow-reversing device according to a principle of the present disclosure.

Now referring to FIGS. 43 and 44, a flow reversing device 1300 will be described. Flow reversing device 1300 is similar to previously described flow reversing device 106 in that flow reversing device 1300 is a substantially cup-shaped member 110 having a central bulge 112 formed therein. Flow reversing device 1300 has a diameter greater than that of second end portion 86 of decomposition tube 82 such that as the exhaust flow enters the cup-shaped member 110, the exhaust flow will be forced to flow in a reverse direction. Reversing the flow direction assists in intermingling of the reagent exhaust treatment fluid and the exhaust stream before the exhaust stream reaches SCR 70.

Flow reversing device 1300 includes a plurality of deflecting members 1302 coupled to an axially extending ring 1304 that is fixed to second end portion 86 of decomposition tube 82. Deflecting members 1302 further assist in intermingling the reagent exhaust treatment fluid and the exhaust stream. Deflecting members 1302 may be formed as a plurality of helically curved vanes 1306 that extend radially outward from ring 1304. Although vanes 1306 are illustrated as being secured to ring 1304, it should be understood that vanes 1306 may be secured to second end portion 86 of decomposition tube 82, without departing from the scope of the present disclosure.

Vanes 1306 induce a high turbulence swirl of the exhaust stream to increase intermingling of the reagent exhaust treatment fluid and the exhaust gases. The high turbulence swirl generated by vanes 1306 results in the reagent exhaust treatment fluid being circumferentially distributed throughout the exhaust stream as it is swirled by vanes 1306. Although six vanes 1306 are illustrated, it should be understood that the number of vanes 1306 is variable. Moreover, the helical pitch of vanes 1306 may also be varied dependent on the amount of swirl desired to be generated. Lastly, it should be understood that flow reversing device 1300 can be used in conjunction with any of the decomposition tubes 82 described including tubes 82 with a radially expanded portion 88, a radially narrowed portion 902, a flared edge 1102, and a truncated first portion 84 (FIG. 39).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust treatment component for treating an engine exhaust, comprising:
   a housing including an inlet and an outlet; and
   a mixing assembly located within the housing between the inlet and the outlet, the mixing assembly including:
      a decomposition tube having a first end and a second end, the first end being configured to receive the exhaust from the inlet and being configured to receive a reagent exhaust treatment fluid; and
      a flow reversing device disposed proximate the second end, the flow reversing device configured to direct a mixture of the exhaust and reagent exhaust treatment fluid as the mixture exits the second end of the decomposition tube in a direction back toward the first end, wherein the flow reversing device includes a plurality of deflecting members for intermixing the exhaust and reagent exhaust treatment fluid, wherein the flow reversing device is a cup-shaped member, and the cup-shaped member includes a plurality of slots formed therein to allow a portion of the mixture of exhaust gas and reagent exhaust treatment fluid to pass through the flow reversing device without being directed back toward the first end of the decomposition tube.

2. The exhaust treatment component of claim 1, wherein the decomposition tube includes a radially-narrowed portion between the first end and the second end.

3. The exhaust treatment component of claim 1, wherein the first end is flared radially outward.

4. The exhaust treatment component of claim 1, further comprising a static mixing device positioned within the decomposition tube between the first end and the second end.

5. The exhaust treatment component of claim 4, wherein the static mixing device includes a plurality of mixing blades that are operable to swirl the mixture of the exhaust and reagent exhaust treatment fluid.

6. The exhaust treatment component of claim 1, wherein flow reversing device includes a plurality of deflecting members connected to a mounting ring, the mounting ring being coupled to the second end of the decomposition tube.

7. The exhaust treatment component of claim 6, wherein the deflecting members are helically curved.

8. The exhaust treatment component of claim 1, wherein the first end of the decomposition tube is truncated.

9. An exhaust treatment system for treating an exhaust produced by an engine, comprising:
   a first exhaust treatment component;
   a second exhaust treatment component;
   a common hood that fluidly and mechanically connects the first and second exhaust treatment components;
   a dosing module mounted to the common hood at a position downstream from the first exhaust treatment component, the dosing module operable to dose a reagent exhaust treatment fluid into the exhaust; and
   a mixing assembly located within the housing and positioned downstream from the dosing module, the mixing device including:
      a decomposition tube having a first end and a second end, the first end being configured to receive the exhaust from the common hood and being configured to receive a reagent exhaust treatment fluid; and
      a flow reversing device disposed proximate the second end, the flow reversing device configured to direct a mixture of the exhaust and reagent exhaust treatment fluid as the mixture exits the second end of the decomposition tube in a direction back toward the first end, wherein the flow reversing device includes a plurality of deflecting members for intermixing the exhaust and reagent exhaust treatment fluid.

10. The exhaust treatment system of claim 9, wherein the decomposition tube includes a radially-narrowed portion between the first end and the second end.

11. The exhaust treatment system of claim 10, wherein the first end is flared radially outward.

12. The exhaust treatment system of claim 11, wherein the first end is spaced apart from the common hood.

13. The exhaust treatment system of claim 9, further comprising a static mixing device positioned within the decomposition tube between the first end and the second end.

14. The exhaust treatment system of claim 13, wherein the static mixing device includes a plurality of mixing blades that are operable to swirl the mixture of the exhaust and reagent exhaust treatment fluid.

15. The exhaust treatment system of claim 9, wherein flow reversing device includes a plurality of deflecting members connected to a mounting ring, the mounting ring being coupled to the second end of the decomposition tube.

16. The exhaust treatment system of claim 15, wherein the deflecting members are helically curved.

17. The exhaust treatment system of claim 9, wherein the flow reversing device is a cup-shaped member, and the cup-shaped member includes a plurality of slots formed therein to allow a portion of the mixture of exhaust gas and reagent exhaust treatment fluid to pass through the flow reversing device without being directed back toward the first end of the decomposition tube.

18. The exhaust treatment system of claim 9, wherein the first end of the decomposition tube is truncated.

19. The exhaust treatment system of claim 9, further comprising a flow distribution plate positioned proximate the first end of the decomposition tube and fixed to the common hood, the flow distribution plate blocking the flow of exhaust in the common hood to force the exhaust to enter the first end of the decomposition tube.

* * * * *

UNITED STATES PATENT AND TRADEMARK OFFICE
CERTIFICATE OF CORRECTION

PATENT NO. : 9,291,081 B2
APPLICATION NO. : 14/165923
DATED : March 22, 2016
INVENTOR(S) : Stanavich et al.

Page 1 of 1

It is certified that error appears in the above-identified patent and that said Letters Patent is hereby corrected as shown below:

Title Page, (*) Notice, after "days" insert --This patent is subject to a terminal disclaimer.--

Specification

Col. 6, line 35: delete "114" and insert --204--

Col. 6, line 37: delete "114" and insert --204--

Col. 11, line 17: delete "114" and insert --204--

Col. 13, line 47: delete "806" and insert --807--

Col. 18, line 6: delete "L1" and insert --$L_1$--

Col. 18, line 7: delete "L2" and insert --$L_2$--

Signed and Sealed this
Fourteenth Day of June, 2016

Michelle K. Lee
*Director of the United States Patent and Trademark Office*